(12) United States Patent
Sellers et al.

(10) Patent No.: US 7,798,528 B2
(45) Date of Patent: Sep. 21, 2010

(54) SPORTS EQUIPMENT TRANSPORT APPARATUS

(75) Inventors: David R. Sellers, 3305 County Rd. 96, Ward, CO (US) 80481; Deanna L. Griffith, Topanga, CA (US); Daniel W. Ashcraft, Torrance, CA (US); Gregory S. Thüne, Hollywood, CA (US)

(73) Assignee: David R. Sellers, Ward, CO (US)

( * ) Notice: Subject to any disclaimer, the term of this patent is extended or adjusted under 35 U.S.C. 154(b) by 823 days.

(21) Appl. No.: 11/444,736

(22) Filed: May 31, 2006

(65) Prior Publication Data

US 2007/0222168 A1    Sep. 27, 2007

Related U.S. Application Data

(63) Continuation-in-part of application No. 11/252,060, filed on Oct. 17, 2005.

(51) Int. Cl.
*B62B 1/22* (2006.01)

(52) U.S. Cl. ..................... 280/814; 280/47.26

(58) Field of Classification Search ............. 280/47.24, 280/47.26, 47.17, 47.131, 652, 809, 814; 224/917, 917.5
See application file for complete search history.

(56) References Cited

U.S. PATENT DOCUMENTS

| 2,042,086 A | * | 5/1936 | Hermenegilde | ............. 280/814 |
|---|---|---|---|---|
| 3,779,568 A | * | 12/1973 | Wakabayashi | ................. 280/9 |
| 4,114,915 A | | 9/1978 | Lello et al. | |
| 4,268,050 A | | 5/1981 | Kennedy, Sr. | |
| 4,358,137 A | | 11/1982 | Gramm | |
| 4,540,198 A | * | 9/1985 | Kyburz | ........................ 280/814 |
| 4,666,184 A | * | 5/1987 | Garvey, Jr. | .................. 280/814 |
| 4,856,811 A | | 8/1989 | Bressler et al. | |
| 5,106,112 A | | 4/1992 | Sargent | |
| 5,240,285 A | | 8/1993 | Harris | |
| 5,277,449 A | | 1/1994 | Schmidt | |
| 5,282,535 A | * | 2/1994 | Rowland | .................. 206/315.1 |
| 5,340,153 A | * | 8/1994 | Parker | ........................ 280/814 |
| 6,070,906 A | | 6/2000 | Allen | |
| 6,086,102 A | | 7/2000 | Stark et al. | |
| 6,360,851 B1 | * | 3/2002 | Yang | .......................... 188/1.12 |
| 6,848,718 B2 | | 2/2005 | Ravikumar et al. | |

* cited by examiner

*Primary Examiner*—Frank B Vanaman
(74) *Attorney, Agent, or Firm*—Daniel P. Dooley; Fellers, Snider, et al.

(57) ABSTRACT

A transport caddy preferably includes at least a wheel supporting a base portion, an alpine snow ski detachably secured between the base and cover portions, and a ski pole disposed within the cover portion and secured adjacent the alpine snow ski by an accessories support portion detachably attached to the alpine snow ski is provided. Preferably, the ski pole is secured to the transport caddy by steps that include at least: positioning a tip of the ski pole within a pole tip confinement aperture provided by the cover; rotating a ski pole confinement member of the accessories support portion into non-adjacency with a ski pole retention portion of the accessories support portion; disposing a shaft portion of said ski pole within the ski pole retention portion; and re-rotating said ski pole confinement member into pressing contact with the shaft portion.

12 Claims, 21 Drawing Sheets

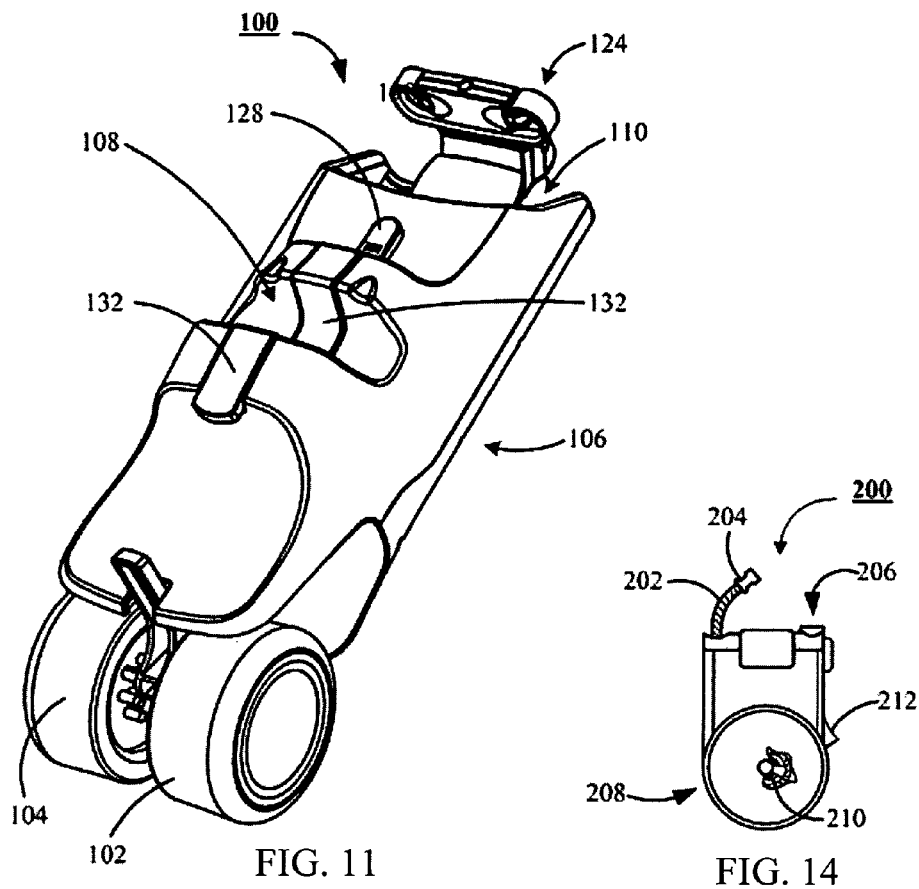
FIG. 11
FIG. 14
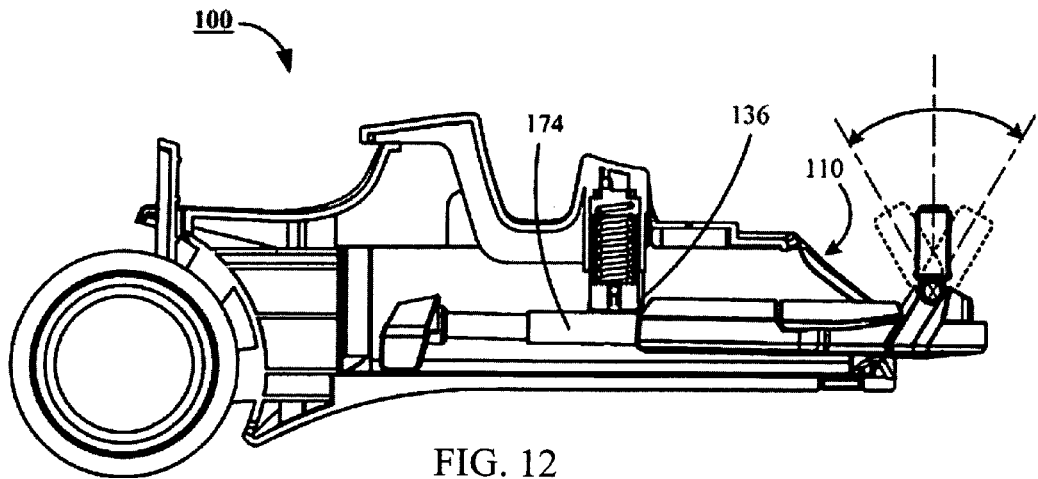
FIG. 12

SPORTS EQUIPMENT TRANSPORT APPARATUS

RELATED APPLICATIONS

This application is a continuation-in-part of U.S. patent application Ser. No. 11/252,060 filed Oct. 17, 2005, entitled SPORTS EQUIPMENT TRANSPORT APPARATUS.

FIELD OF THE INVENTION

The claimed invention relates to the field of sports equipment transport apparatuses; more particularly, but not by way of limitation, to an apparatus for transporting snow ski equipment.

BACKGROUND

Transporting snow skis, poles, helmet, and goggles from a ski bus, train, or automobile to a ski lodge can be awkward, cumbersome, and potentially hazardous to the skier and to others that may happen to come in close proximity to the skier. Attempts in the prior art to address the problem include: an elastic ski covering having removable fasteners, which fails to provide a convenient compartment for safe storage of ski poles during transport; ski and pole cases that are large, bulky, and difficult to control; and attachable wheels, that require alterations to the skis to become functional.

Accordingly, there is a continuing need for improved devices and procedures for the transport of snow ski equipment.

SUMMARY OF THE INVENTION

In accordance with preferred embodiments, a transport caddy including at least a base portion supported by a wheel and providing a cover restraint, a cover portion selectively constrained adjacent said base portion by the cover restraint, a spring suspension removably disposed within the base portion and detachably secured within the base portion by the cover portion, an accessories support portion detachably attached to the spring suspension and a tow handle removably disposed within the accessories support portion and detachably secured adjacent the spring suspension by the accessories support member is provided.

Preferably, the spring suspension is an alpine snow ski, the tow handle is an alpine ski pole, and the base portion includes at least a wheel engagement member attached to the wheel, an accessories buttress member protruding from the wheel engagement member, and a suspension retention member supported by the accessories buttress member, wherein the suspension retention member pressingly engages the alpine snow ski when cover restraint constrains the cover portion adjacent the base portion.

In a preferred embodiment, a pair of alpine snow skis are positioned within the base portion, the cover portion is closed adjacent the alpine snow ski, and the cover restraint is activated to secure the alpine snow ski between the cover and base portions. With the alpine skis secured in the base portion, the accessories support member is placed adjacent a brake of a selected one of the alpine snow skis, and lashed adjacent a binding of the selected one of the alpine snow skis.

With the accessories support member detachably attached adjacent the ski binding, a tip of a ski pole is deposited within a tip confinement aperture of the cover, a ski pole confinement member of the accessories support member is rotated into non-adjacency with a ski pole retention portion of the accessories support member to provide access by the ski pole to the ski pole retention portion. A shaft portion of the ski pole within a ski pole retention portion of the accessories support member, and re-rotating the ski pole confinement member into pressing contact with the shaft portion to securely confine the shaft portion within the ski pole retention portion.

With the ski pole retention portion made accessible to the ski pole, a shaft portion of the ski pole is slid past a pole retention spring clip of the accessories support member and into contact with said pole confinement member, and upon re-rotation of the ski pole confinement member, the shaft of the ski pole is placed into pressing contact with the ski pole confinement member.

These and various other features and advantages which characterize the claimed invention will be apparent from reading the following detailed description and a review of the associated drawings.

BRIEF DESCRIPTION OF THE DRAWINGS

FIG. 11 is a perspective view of the novel sports equipment transport apparatus of FIG. 1 configured for storage.

FIG. 12 is a partial cutaway, side elevational view of the novel sports equipment transport apparatus of FIG. 11.

FIG. 14 is a plan view of a cable lock for use in securing an un-attended novel sports equipment transport apparatus of FIG. 1 to a stationary structure.

DETAILED DESCRIPTION

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated and lie within the scope and spirit of the invention.

Figure 1:
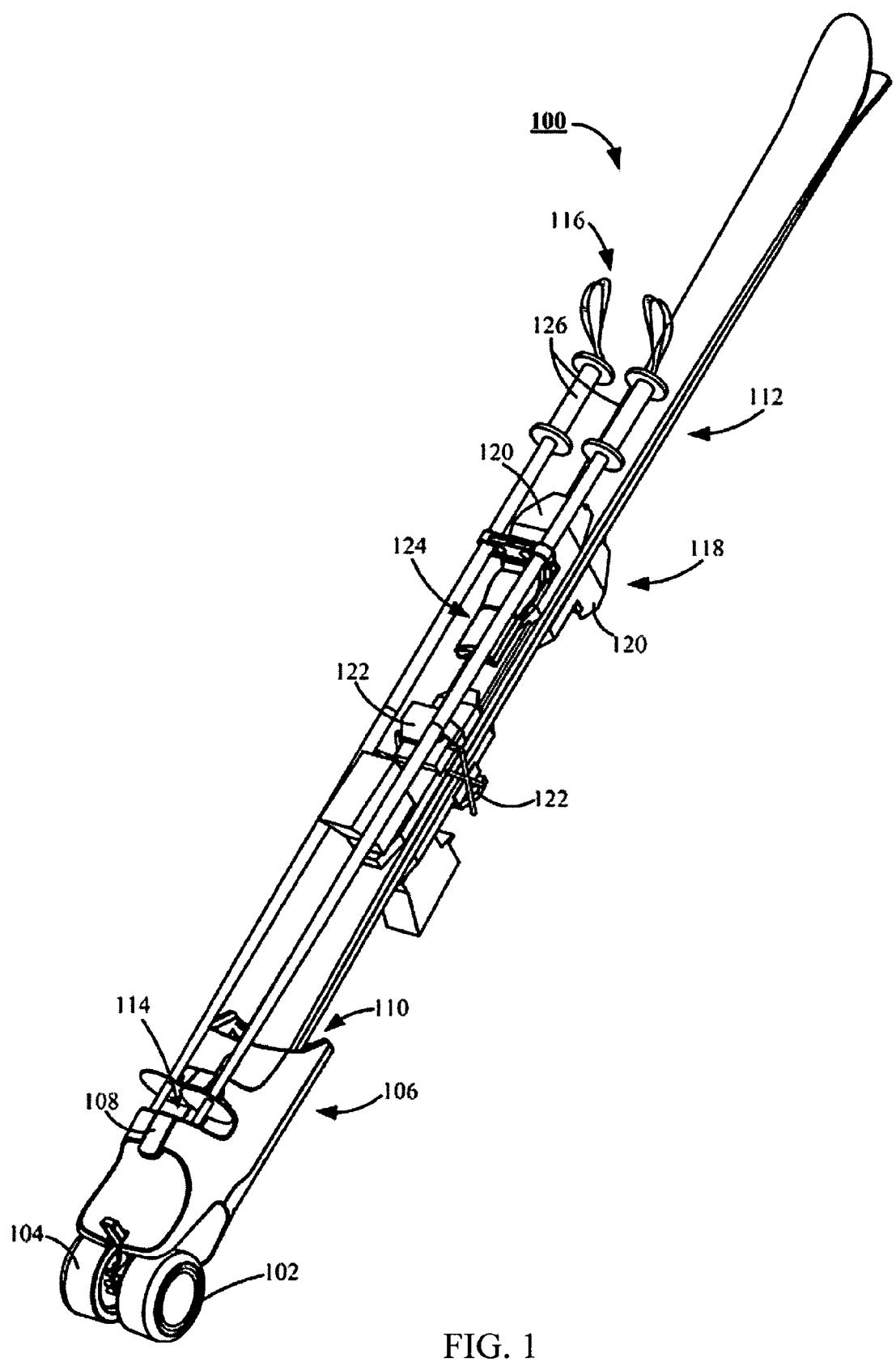
FIG. 1 is a perspective view of the novel sports equipment transport apparatus with snow ski equipment secured thereon.

Referring to the drawings, FIG. 1 shows a novel sports equipment transport apparatus ("transport") 100. The transport 100 has been found useful for manually transporting sports equipment, in particular for use in transporting snow ski equipment. The transport 100 maintains the ski equipment in an organized and transportable configuration, which allows the skier to easily transport the equipment from a car to, for example, a ski lodge, airline terminal, hotel, or home. To facilitate the organization and transport of the ski equipment, the transport 100 preferably provides at least one wheel 102, and more preferably a second wheel 104. The wheels 102 and 104 support a transport caddy 106, which in turn supports a spring loaded mechanical latch 108 secured to the transport caddy.

In a preferred embodiment, the transport caddy provides a primary confinement compartment 110 configured to accept a pair of alpine snow skis ("skis") 112, and a secondary confinement compartment 114 configured to accept a pair of ski poles 116. Each ski of the pair of skis 112 includes a ski boot binding 118 (also referred to herein as binding 118), which includes at least a toe confinement portion 120 and a brake portion 122. In a preferred embodiment, the pair of skis 112 are positioned within the primary confinement compartment 110 such that the binding 118 of a first ski of the pair of skis 112 faces ground-wardly, while the binding 118 of a second ski of the pair of skis 112 faces sky-wardly.

In the preferred embodiment, the transport 100 further includes an accessories support member 124 supported by the sky-wardly facing binding 118. Securing the accessories support member 124 to the sky-wardly facing binding 118 provides a number of advantages to users of the transport 100. Those advantages result from the relationship between a length of the skis 112 and the height of the skier utilizing skis 112 of a particular length. Preferably, as the height of a skier increases, the length of the skis utilized by that skier increases, however the positional relationship of ski boot binding 118, relative to the tip of the ski supporting the ski boot binding 118, remains substantially constant. In addition to the substantially constant relationship between the positions of the binding relative to the ski tips, the ratio between the overall length of the skis 112 and the overall length of its accompanying pair of ski poles 116 also remains substantially constant.

By selecting the sky-wardly facing binding 118 as the mounting position for the accessories support member 124, and securing the pair of ski poles 116 to the accessories support member 124, the handle portions 126 of the pair of ski poles 116 are present to the skier at a natural and convenient height for use in towing the skis (provided the skis being towed are sized to the person towing the skis). It is also noted that by presenting both handle portions 126 to the skier at substantially a common height, but offset from one another, the handle portions are positioned for convenient use by the skier using either their right or left hand.

An additional advantage of preferably selecting the sky-wardly facing binding 118 as the mounting position for the accessories support member 124, is that the load of the transport 100, with the skis 112 and the pair of ski poles 116 secured thereto is substantially distributed for enhanced mobility. By preferentially depositing the pair of skis 112 within the primary confinement compartment 110 such that the bindings 118 and the pair of skis 112 respectfully face ground-wardly and sky-wardly, the amount of flex engineered into each ski of the pair of skis provides a primary spring suspension between the wheels 102 and 104 and the handle portion 126. By mounting the pair of ski poles 116 above the ski boot binding 118, and parallel to the pair of skis 112, a secondary spring suspension is provided between the wheels 102 and 104. The result of the primary and secondary suspensions working in concert mitigates and dampens mechanical shocks encountered by the wheels 102 and 104 traversing uneven and disruptive surfaces.

Figure 2:
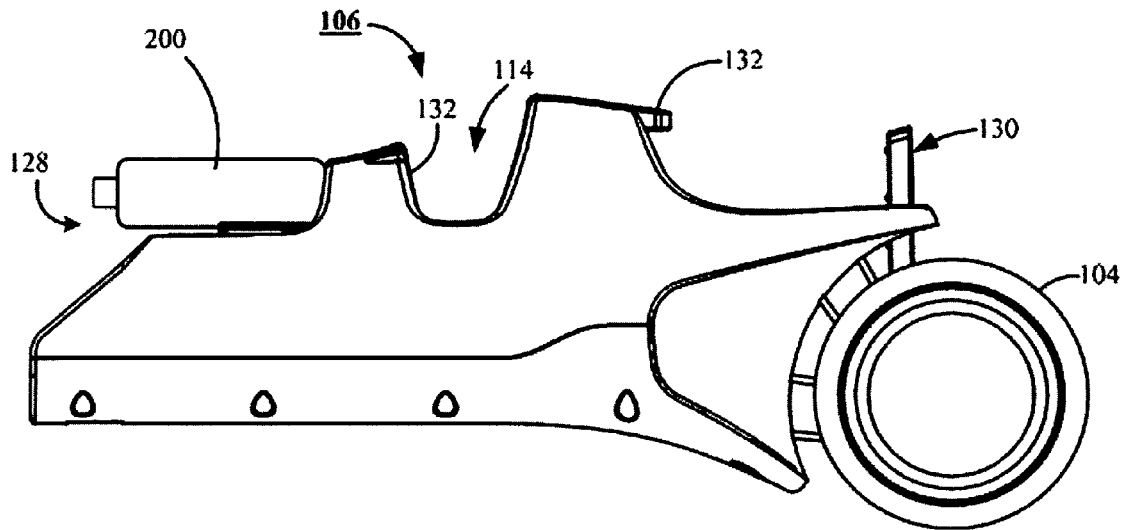
FIG. 2 is a side elevational view of the novel sports equipment transport apparatus of FIG. 1.
Figure 3:
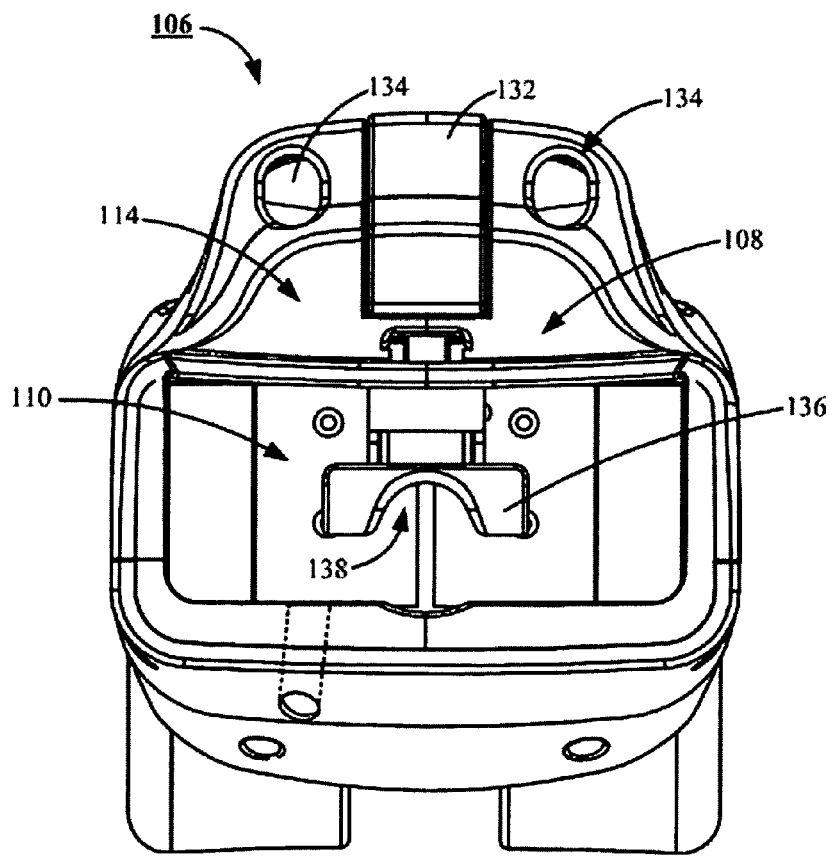
FIG. 3 is a top plan view of the novel sports equipment transport apparatus of FIG. 1.

FIG. 2 shows the transport caddy 106 preferably further includes a cable lock support member 128, a brake assembly 130 disposed adjacent the wheel 104, and that a mechanical lever 132, which conforms to an interior contour 145 (of FIG. 4) of the secondary confinement compartment 114. While FIG. 3 shows the transport caddy 106 provides a pair of ski pole tip apertures 134 and a plunger 136 of the spring loaded mechanical latch 108. The plunger 136 provides a relief 138, which is configured to accommodate securement of the accessories support member 124 (of FIG. 1) within the primary confinement compartment 110, when the primary confinement compartment is not in use for transporting the skis 112 (of FIG. 1). The ski pole tip apertures 134 provide access by a tip 140 (of FIG. 4) of each ski pole of the pair of ski poles 116 (of FIG. 4). In a preferred embodiment, the transport caddy 106 is preferably formed from a polymer such as ABS, and the plunger is formed from a polymer such as Delron®, or Nylon®.

Figure 4:
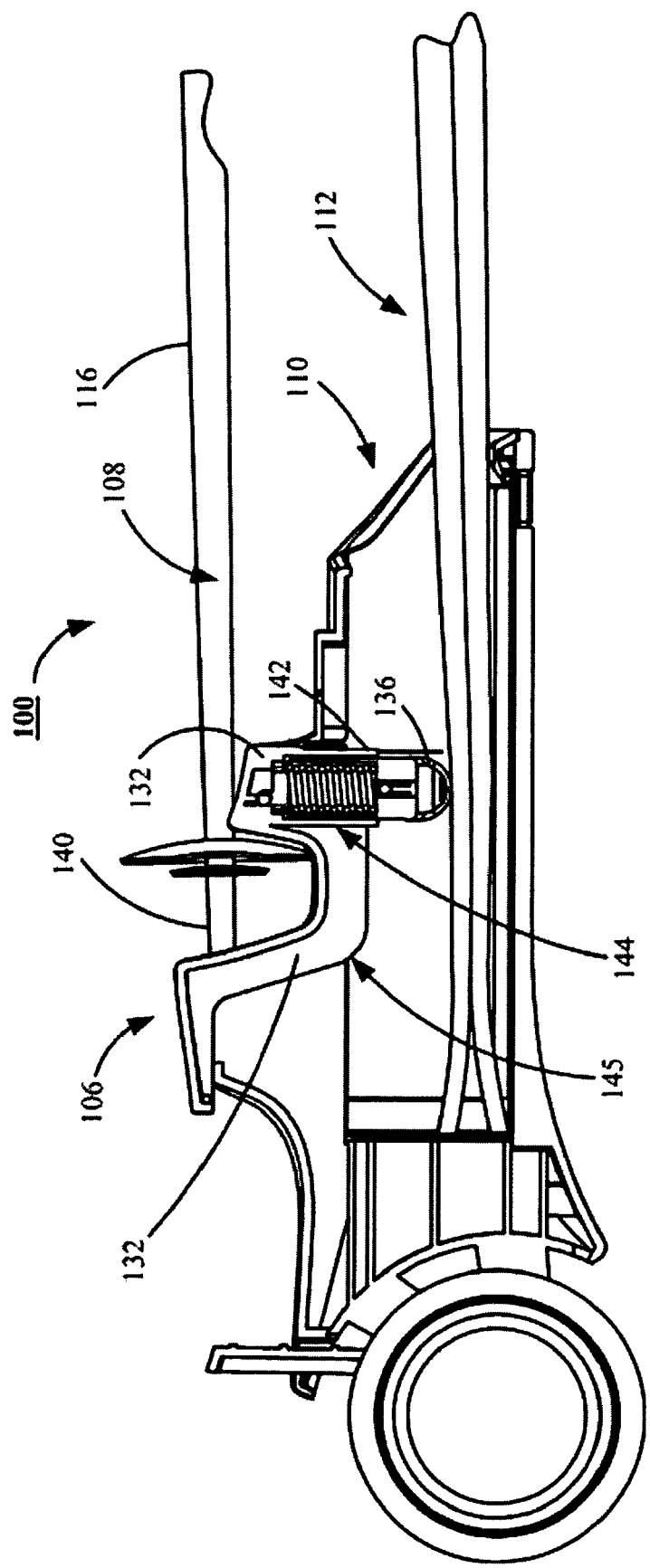
FIG. 4 is a partial cutaway, side elevational view of the novel sports equipment transport apparatus of FIG. 1.

Continuing with FIG. 4, the cross-sectional view of the transport caddy 106 shows the spring loaded mechanical latch 108 preferably includes a shaft 142 provided by the mechanical lever 132, the plunger 136 secured to said shaft 142, a compressive spring ("spring") 144 communicating with the plunger 136, and the mechanical lever 132 in pressing contact with the interior contour 145 of the secondary confinement compartment 114. The mechanical lever 132 communicates with and acts on the spring 144 when the mechanical lever 132 is in a closed position. The spring 144 develops a compressive force in response to the mechanical lever 132 being placed in the closed position, as shown by FIG. 4. The spring 144 transfers said compressive force to the plunger 136 to secure the skis 112 within the primary confinement compartment 110, or to secure the accessories support member 124 within the primary confinement compartment 110 (as shown by FIG. 11), when the transport caddy is not being used to transport skis 112.

Figure 5:
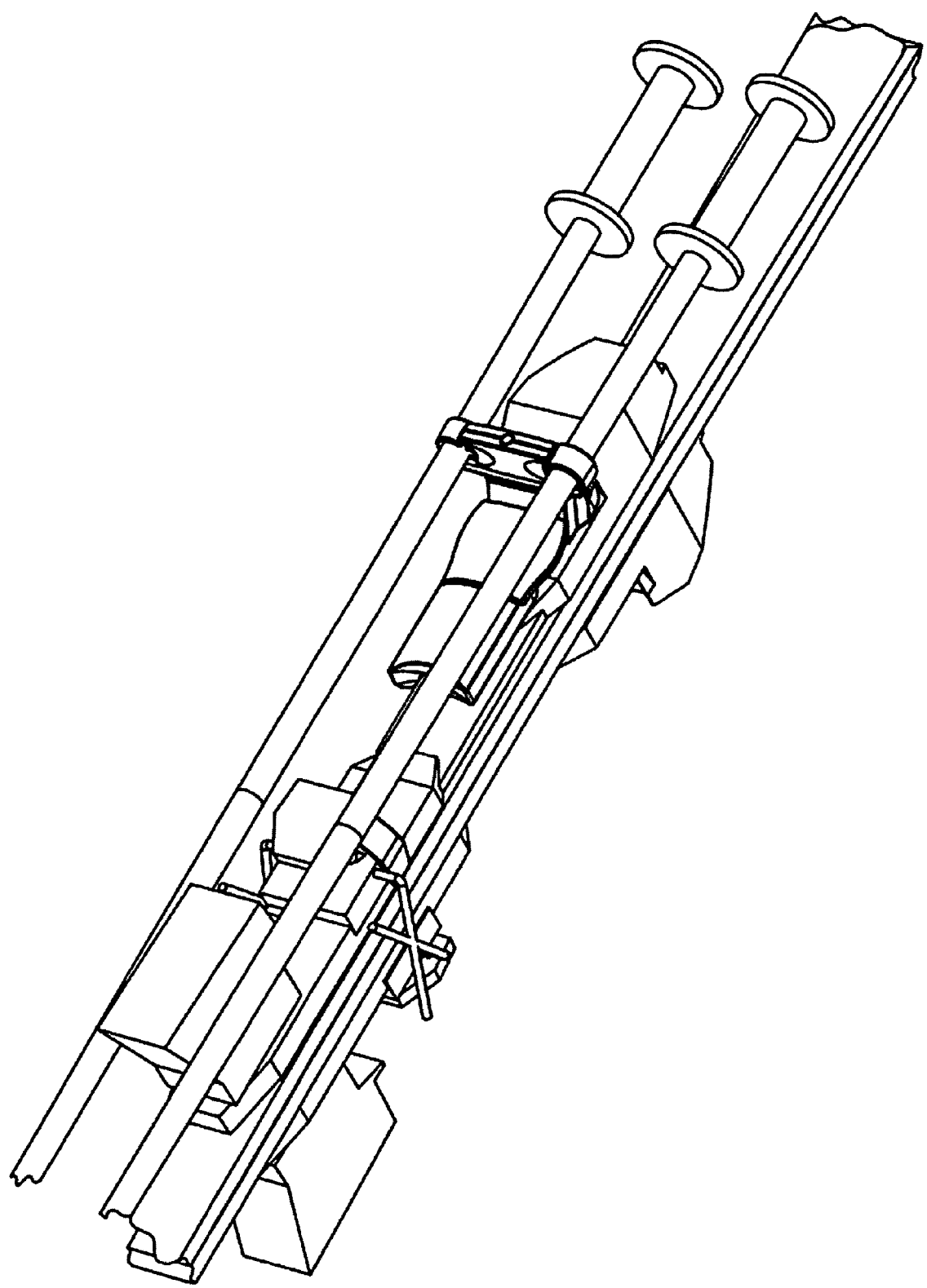
FIG. 5 is a partial cutaway, perspective view of the novel sports equipment transport apparatus of FIG. 1.
Figure 6:
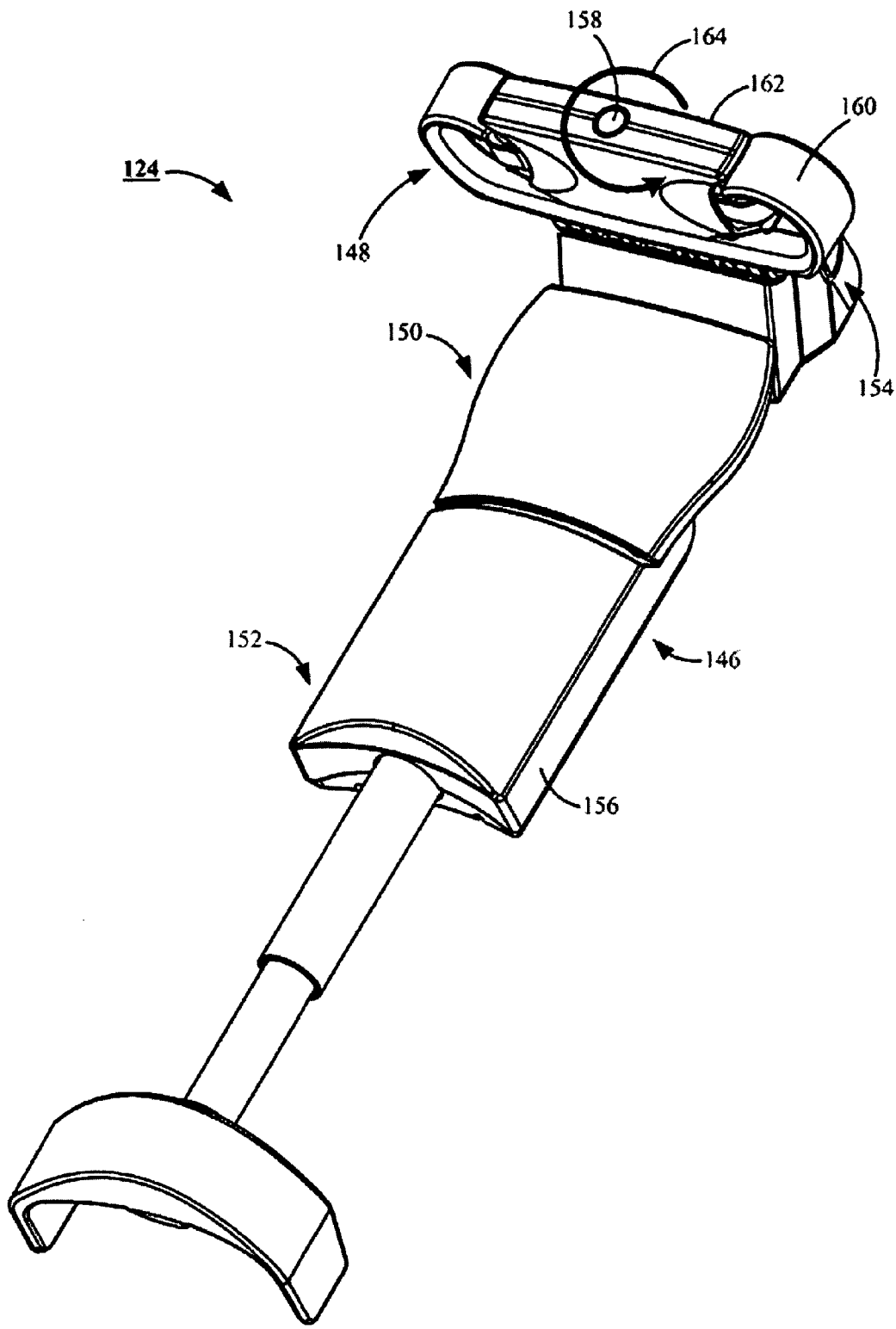
FIG. 6 is a perspective view of an accessories support member of the novel sports equipment transport apparatus of FIG. 1.

To gain an enhanced understanding of the accessories support member 124 shown by FIGS. 5 through 8, those figures should preferably be viewed in concert. FIG. 5 provides an improved perspective of the relationship between the skis 112, the ski poles 116, the binding 118, and the accessories support member 124, while FIG. 6 illustrates a first attachment member 146 supporting an accessories confinement assembly 148 (also referred to herein as a ski pole confinement assembly 148), a lockdown assembly 150 adjacent the accessories confinement assembly 148, and a sizing assembly 152 adjacent the lockdown assembly 150. The first attachment member 146 preferably includes a front confinement portion 154, which cooperates with the toe confinement portion 120 of the binding 118 (of FIG. 1), and a main body portion 156 to which the lockdown assembly 150 and the sizing assembly 152 are attached to.

Figure 7:
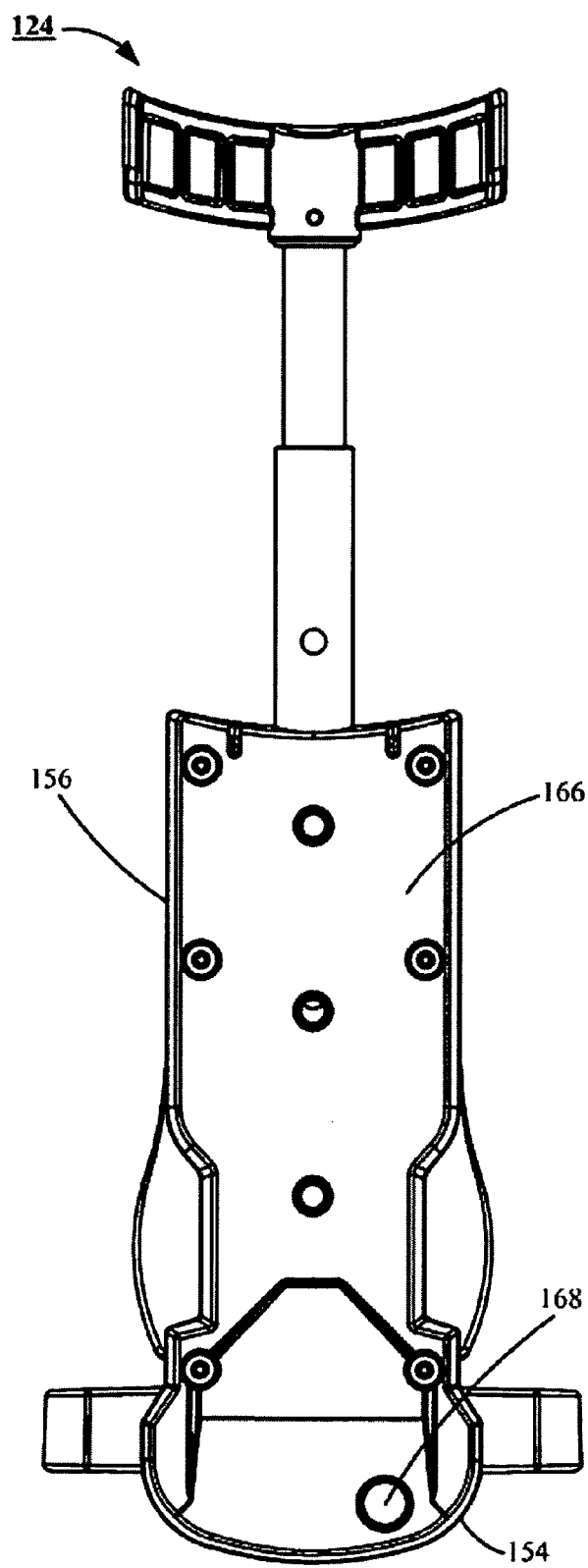
FIG. 7 is a bottom plan view of the accessories support member of FIG. 6.

The accessories confinement assembly 148 preferably includes at least a central support shaft 158 fixedly secured to the main body portion 156, an accessories retention portion 160 (also referred to herein as a ski pole retention portion 160) adjacent the central support shaft 158 and attached to main body portion 156, and an accessories confinement member 162 (also referred to herein as a ski pole confinement member 162) adjacent the accessories retention portion 160 and retained by the central support shaft 158 for rotation about the central support shaft 158, as shown by the rotational vector 164. FIG. 7 shows the first attachment member 146 further includes a base 166 upon which the main body portion 156 and a front confinement portion 154 are secured, and a cable lock access aperture 168 for use in securing the transport 100 (of FIG. 1) to a stationary object when the transport 100 is not in use for towing ski equipment.

Figure 8:
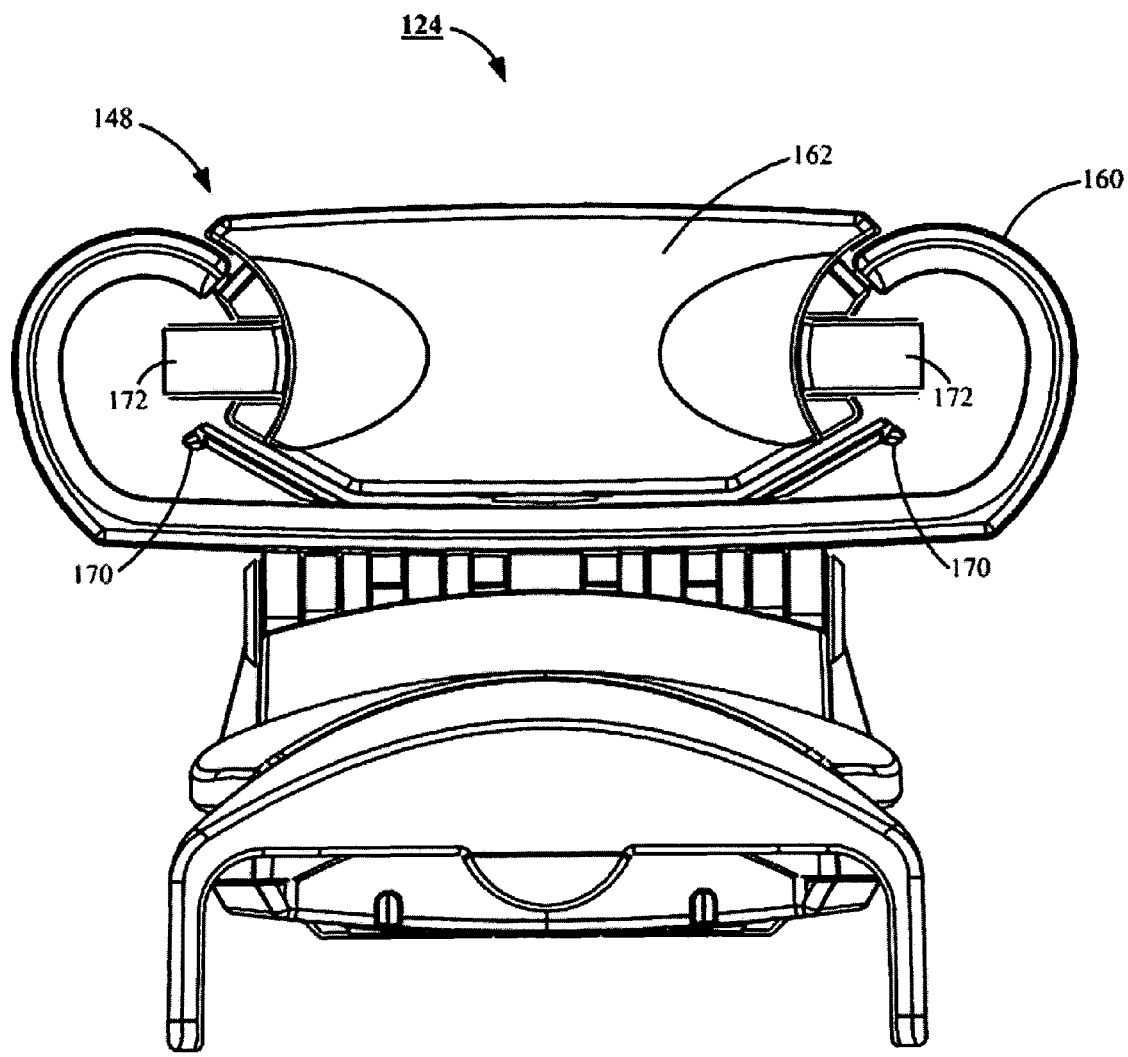
FIG. 8 is an end elevational view of the accessories support member of FIG. 6.

FIG. 8 shows the accessories confinement assembly 148 further preferably includes a pair of pole retention spring clips 170, which are used to promote the securement of the ski poles 116 (of FIG. 5) within the accessories retention portion 160, and a pair of pole confinement bumpers 172, which maintain the ski poles 116 pressingly engaged against the interior wall of the accessories retention portion 160. In a preferred embodiment the pole confinement bumpers 172 are produced from a flexible polymer that conforms to the shape of the ski poles 116 when securing the poles against the interior wall of the accessories retention portion 160, and return to their original form when the pole confinement bumpers 172 are disengaged from securement of the poles.

Figure 9:
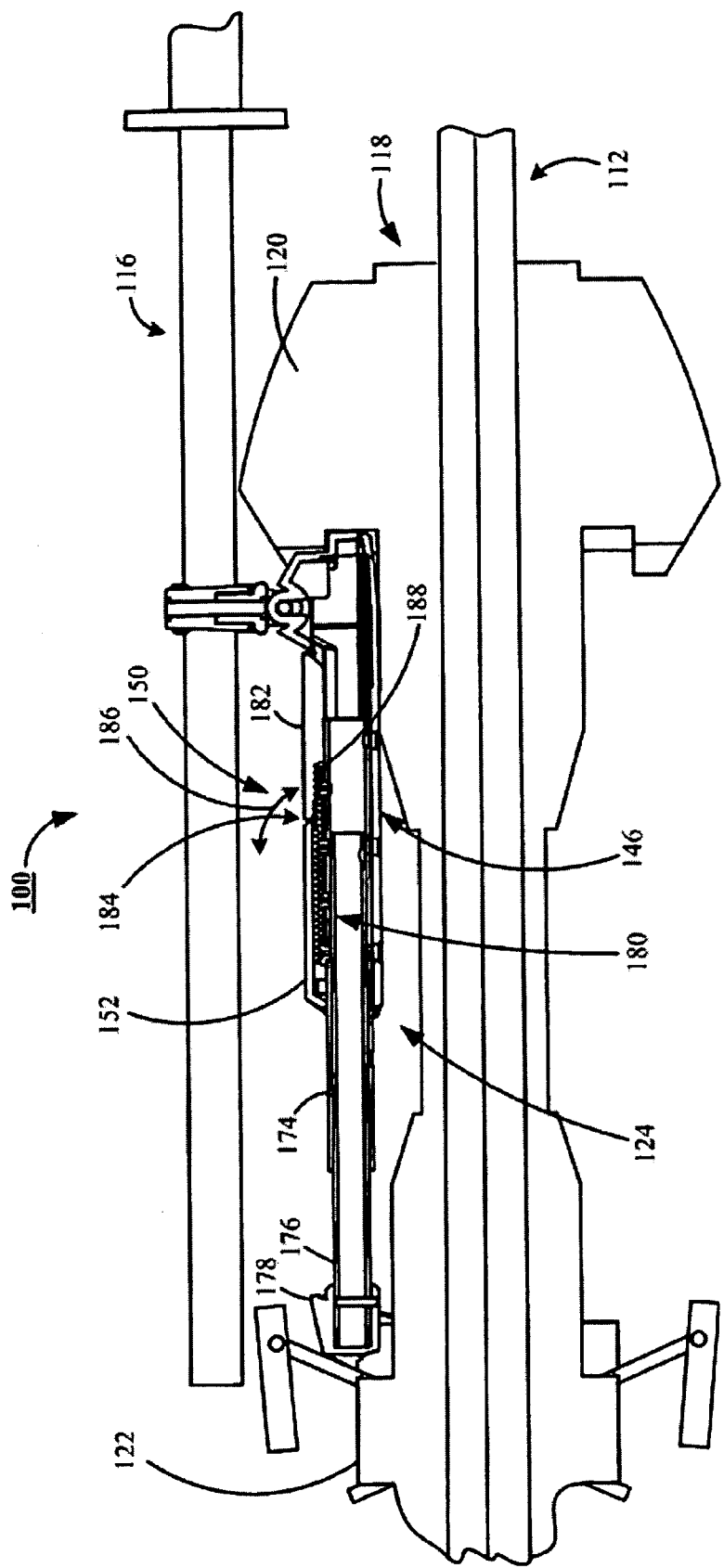
FIG. 9 is a partial cutaway, side elevational view of the novel sports equipment transport apparatus of FIG. 1.

FIG. 9 primarily shows a cross-sectional view of the interaction between the lockdown assembly 150 and the sizing assembly 152. The sizing assembly 152 preferably includes a positioning member 174 in sliding contact with the first attachment member 146, and an extension member 176 in sliding contact with the positioning member 174, which supports a second attachment member 178. The positioning member 174 further provides a retention portion 180, which in a preferred embodiment takes on the configuration of a rack portion of a rack and pinon gear.

The lockdown assembly 150 preferably includes a cover portion 182 that communicates with a hinge member 184, which rotates relative to the positioning member 174 as shown by the rotational vector 186. The cover portion 182 provides a retention feature 188 that is configured to interact with the retention portion 180 of the sizing assembly 152. When mounting the accessories support member 124 to the binding 118, the retention feature 188 of the cover portion 182 is disengaged from the retention portion 180 of the positioning member 174, by placing the cover portion 182 in an open position. With the cover portion 182 in an open position the accessories support member 124 is positioned to snugly fit within the binding 118, and once in position, the cover portion 182 is placed in a closed position such that the retention feature 188 interacts with the retention portion 180 of the positioning member 174 to securely lock the access support member 124 within the binding 118.

Figure 10:
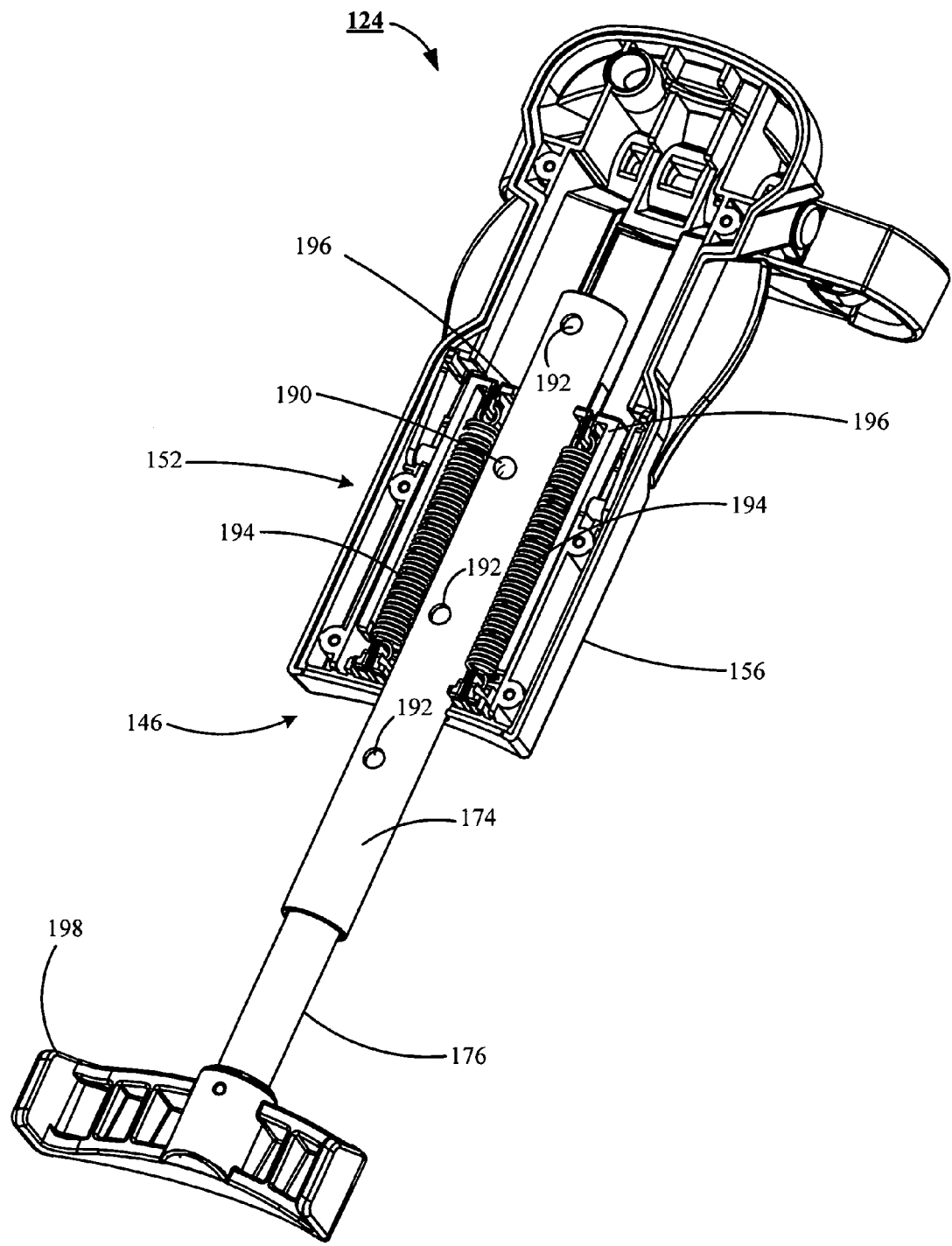
FIG. 10 is a bottom perspective view of the accessories support member of FIG. 6, with a base plate removed for ease of viewing.

FIG. 10 provides a preferred viewing of the sizing assembly 152, which includes the positioning member 174 that is preferably configured to slide within the main body portion 156 of the first attachment member 146. In a preferred embodiment the sizing assembly 152 includes the extension member 176 that slides within the positioning member 174. It will be noted that the extension member 176 provides a spring-loaded retention button 190 that interacts with the sizing apertures 192 provided by the positioning member 174.

By positioning the retention button 190 within a selected one of the sizing apertures 192, a gross sizing of the accessories support member 124 relative to a particular sizing of the binding 118 (of FIG. 5) is attained. To ensure proper sizing of the accessories support member 124 relative to a particular sizing of the binding 118, preferably a pair of tension springs 194 interact between the main body portion 156 and a pair of spring tabs 196 to adjust the overall size of the accessories support member 124 to precisely fit a particular sizing of the binding 118. To accommodate stability of the accessories support member 124 relative to the binding 118, the extension member 176 further provides a second attachment member 198. The second attachment member 198 preferably interacts with the brake portion 122 of the binding 118 (a FIG. 5).

FIGS. 11 and 12 each show the transport 100 configured for storage. As shown by FIG. 11, in a storage configuration the wheels 102 and 104 preferably continues to support the transport caddy 106, however rather than the skis 112 (of FIG. 1) being confined within the primary confinement compartment 110, the accessories support member 124 is preferably confined within the primary confinement compartment 110, and retained in position by the mechanical lever 132 (of the spring loaded mechanical latch 108) interacting with the transport caddy 106. FIG. 12 shows the interaction between the plunger 136 and the positioning member 174 that results in the confinement of the accessories support member 124 within the primary confinement compartment 110.

Figure 13:
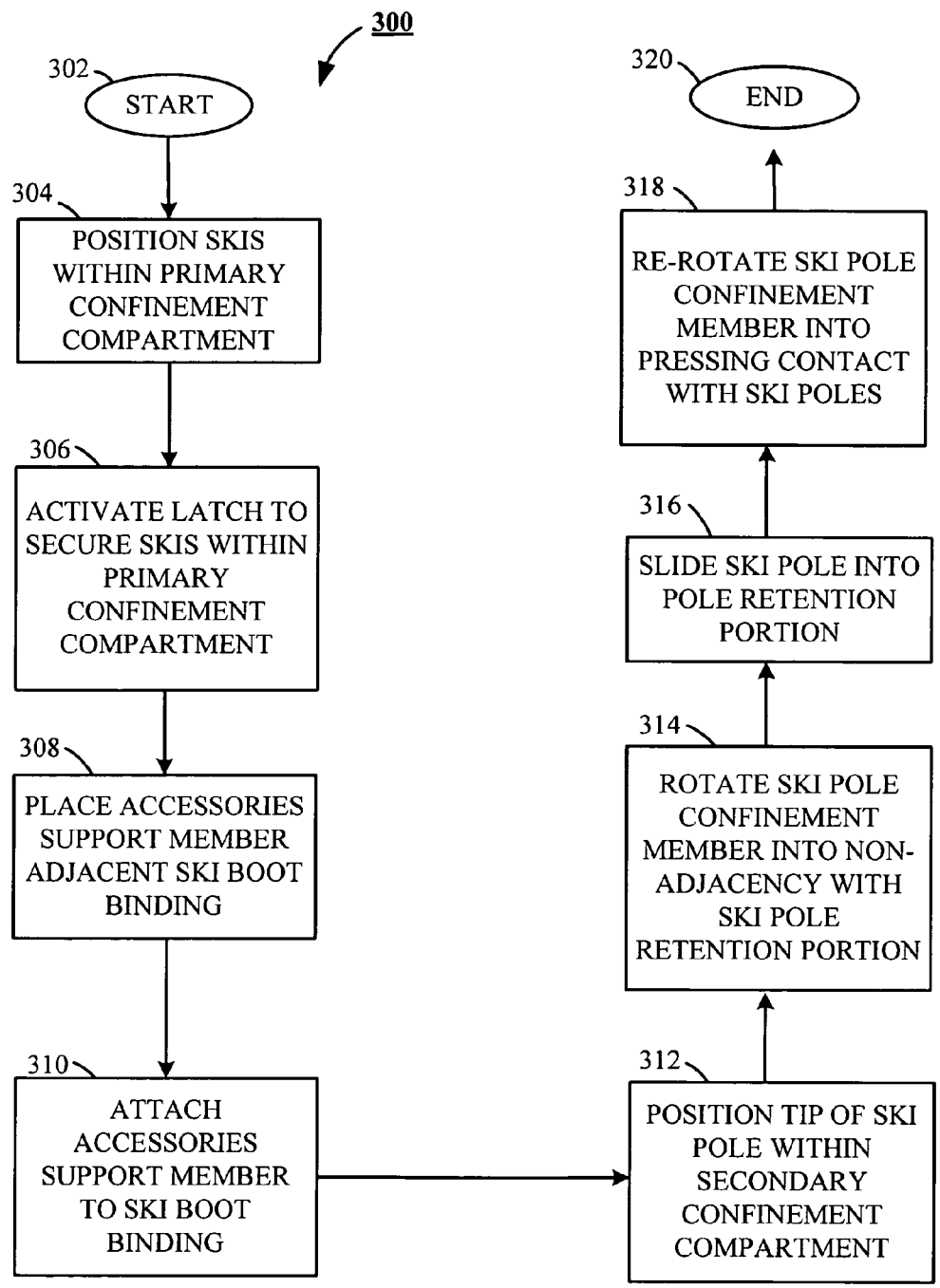
FIG. 13 is a flowchart of a method of using the novel sports equipment transport apparatus of FIG. 1.

FIG. 13 shows a method 300 of using an inventive sports equipment transport apparatus (such as 100) commencing at start step 302 and continuing at process step 304. At process step 304, a pair of skis (such as 112) are positioned within a primary confinement compartment (such as 110), and at process step 306, a spring loaded mechanical latch (such as 108) is activated to secure the skis within the confinement compartment.

At process step 308, an accessories support member (such as 124) is placed adjacent a ski boot binding (such as 118). At process step 310, the accessories support member is attached to the ski boot binding. At process step 312, each tip (such as 140) of a pair of ski poles (such as 116) are advanced through corresponding ski pole tip apertures (such as 134) to each position each tip of each ski pole within a secondary confinement compartment (such as 114). With the tips of the ski poles positioned within the secondary confinement compartment, a ski pole confinement member (such as 162) is rotated into non-adjacency with a ski pole retention portion (such as 160) at process step 314.

At process step 316, each shaft (such as 158) of each ski pole is slid into their respective positions within the ski pole retention portion. At process step 318, the ski pole confinement member is re-rotated into pressing contact with the respective shaft portions of each ski pole, and the process concludes at end process step 320.

FIG. 14 shows a cable lock 200 that has been found useful for security purposes, when the transport 100 is configured for storage, as shown by FIG. 11. When in use, the cable lock 200 mitigates against theft of the transport 100, particularly when left unattended by the skier. When the cable lock 200 is not in use, the transport caddy 106 (of FIG. 11) provides the cable lock support member 128, which accommodates placement of the cable lock 200 on the transport caddy 106 as shown by FIG. 2.

The cable lock 200 provides a retention cable 202 that includes a lock interface 204, a lock receptacle 206, a spring activated recoil assembly 208 that features a recoil spring 210, and a recoil button 212, which when activated causes the recoil assembly 208 to retrieve the retention cable 202 from an uncoiled presentation to a recoiled presentation within the spring activated recoil assembly 208.

Figure 15:
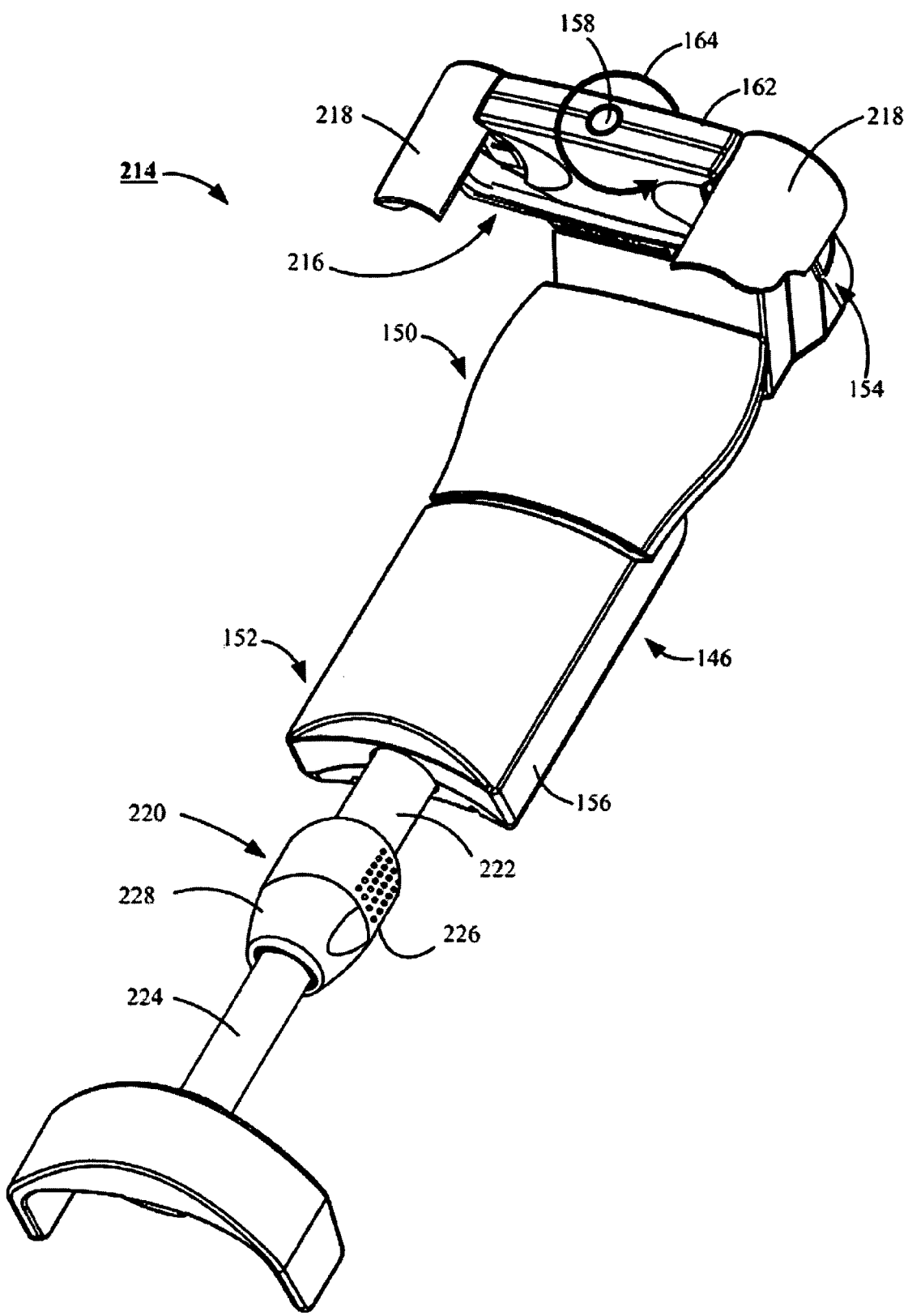
FIG. 15 is a top perspective view of an alternate preferred embodiment of an accessories support member.

FIG. 15 illustrates an alternate preferred embodiment of an accessories support member 214. The accessories support member 214 includes an accessories retention portion 216 (also referred to herein as a ski pole retention portion 216) adjacent the central support shaft 158, and features a hanging support portion 218, which aids in the retention of the accessories support member 214 when hung on a ski rack. The accessories support member 214 further includes an expansion collet 220 that joins a positioning member 222, in sliding contact with the first attachment member 146, with an extension member 224. By loosening an adjustment member 226 of the collet 220 relative to the retention jaw member 228, the extension member 224 can be slid axially relative to the positioning member 222.

Figure 16:
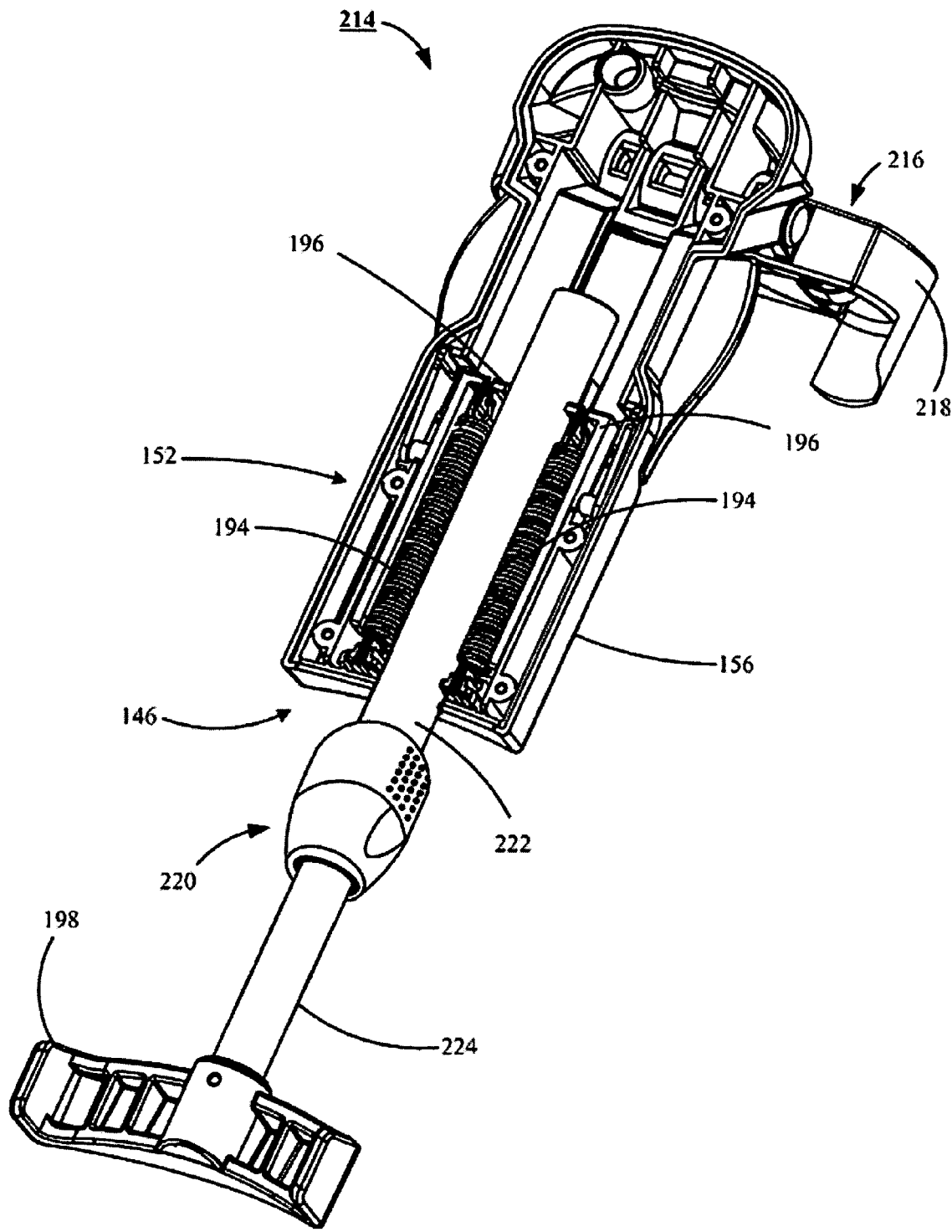
FIG. 16 is a bottom perspective view of the alternate preferred embodiment of the accessories support member of FIG. 15.
Figure 17:
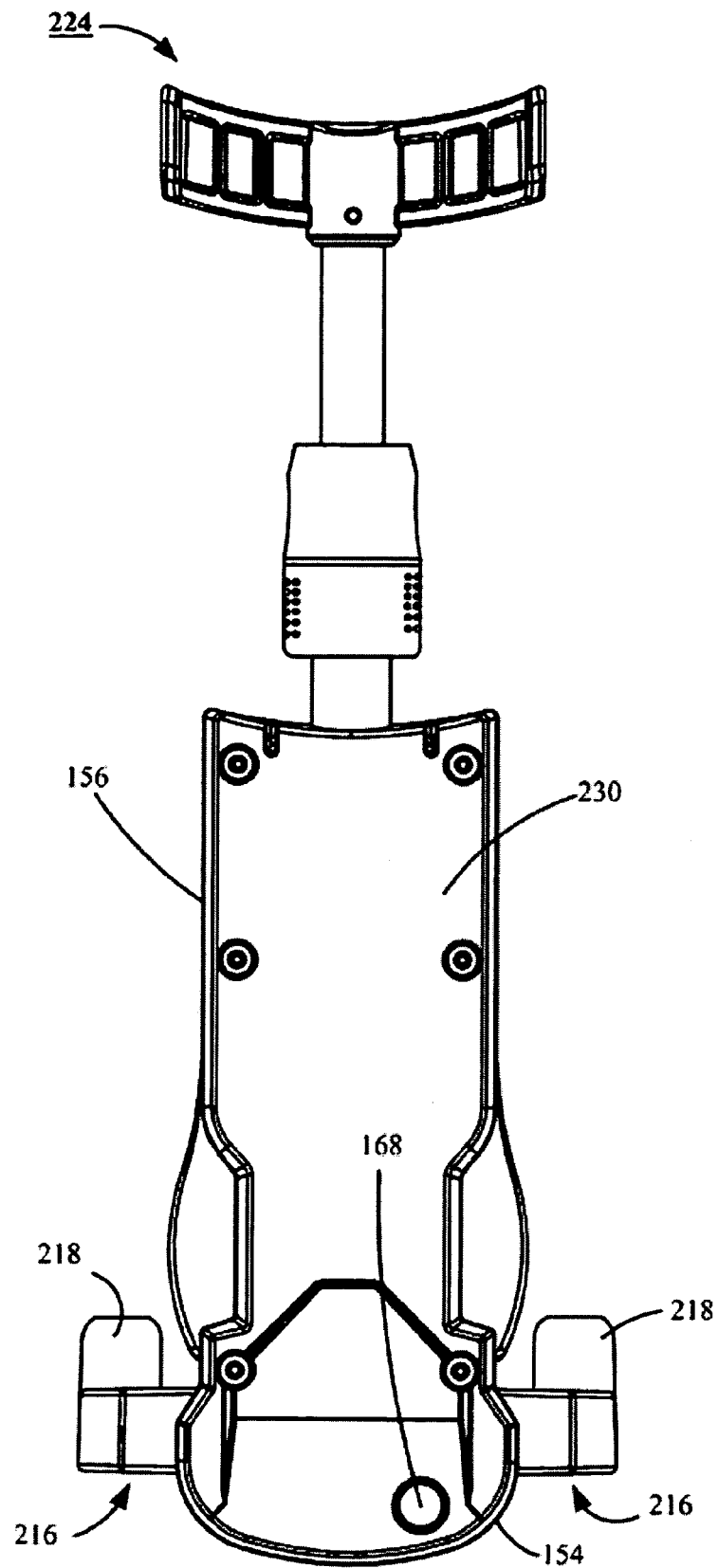
FIG. 17 is a bottom plan view of the alternate preferred embodiment of the accessories support member of FIG. 15.

FIG. 16 shows the positioning member 222 communicates with the pair of tension springs 194 that interact between the main body portion 156 and a pair of spring tabs 196 to adjust the overall size of the accessories support member 214 to precisely fit a particular sizing of the binding 118 (of FIG. 5). While FIG. 17 shows a base 230 upon which the main body portion 156 and a front confinement portion 154 are secured, and a cable lock access aperture 168 for use in securing the accessories support member 214 to a stationary object when not in use.

Figure 18:
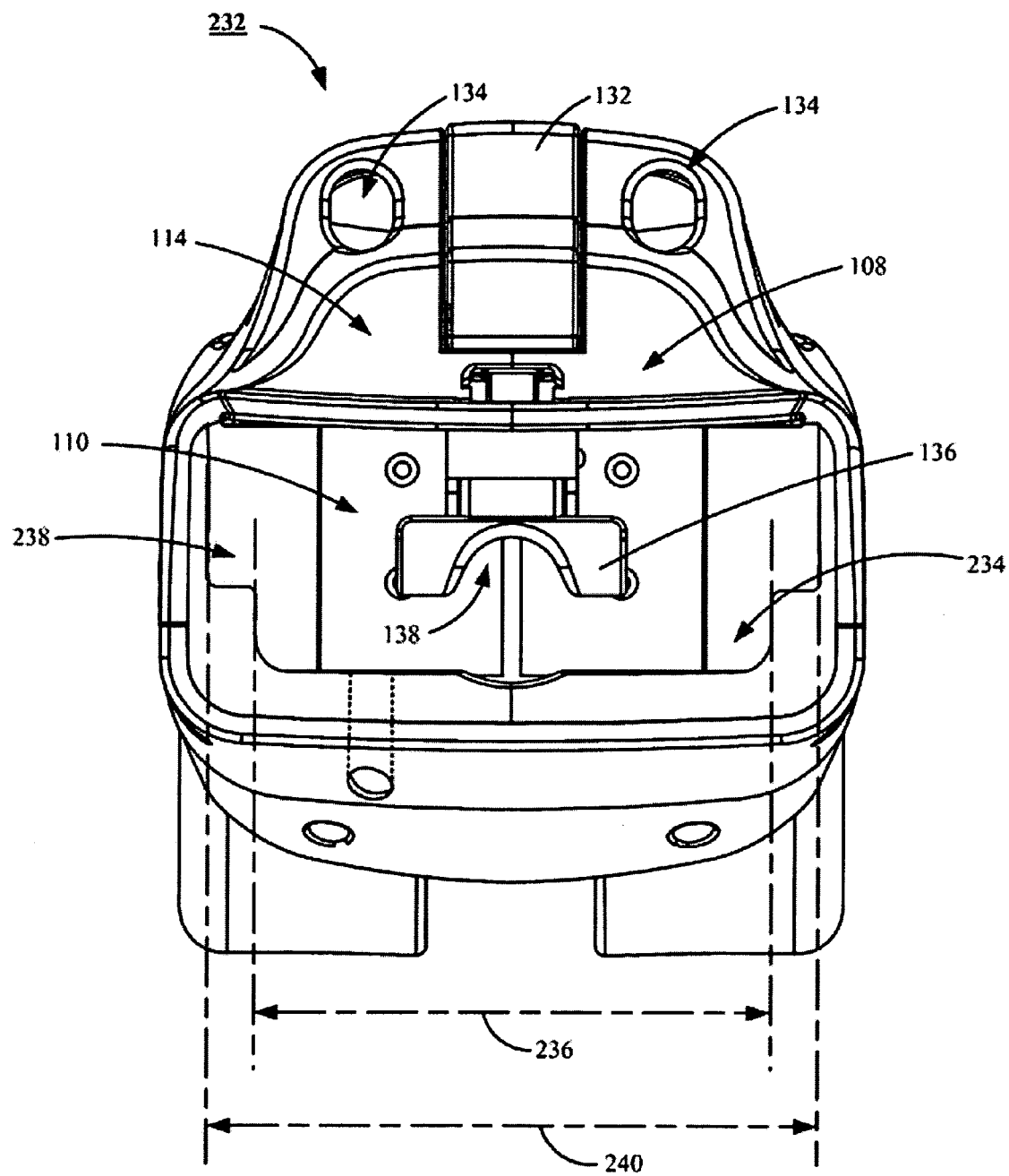
FIG. 18 is a top plan view of an alternate preferred embodiment of a novel sports equipment transport apparatus of FIG. 1.

FIG. 18 shows that an alternate preferred embodiment transport caddy 232 provides a pair of ski pole tip apertures 134 and a plunger 136 of the spring loaded mechanical latch 108. The plunger 136 provides a relief 138, which is configured to accommodate securement of the accessories support member 224 (of FIG. 15) within the primary confinement compartment 110, when the primary confinement compartment is not in use for transporting skis 112 (of FIG. 1). The ski pole tip apertures 134 provide access by a tip 140 (of FIG. 4) of each ski pole of the pair of ski poles 116 (of FIG. 4). In a preferred embodiment, the transport caddy 232 provides a first ski access aperture 234 configured to accommodate skis equal to and less than width 236, and a second ski access aperture 238 configured to accommodate skis having a width greater than width 236, and less than or equal to width 240. The transport caddy 232 is preferably formed from a polymer such as ABS, and the plunger is formed from a polymer such as Delron®, or Nylon®.

Figures 19, 20:
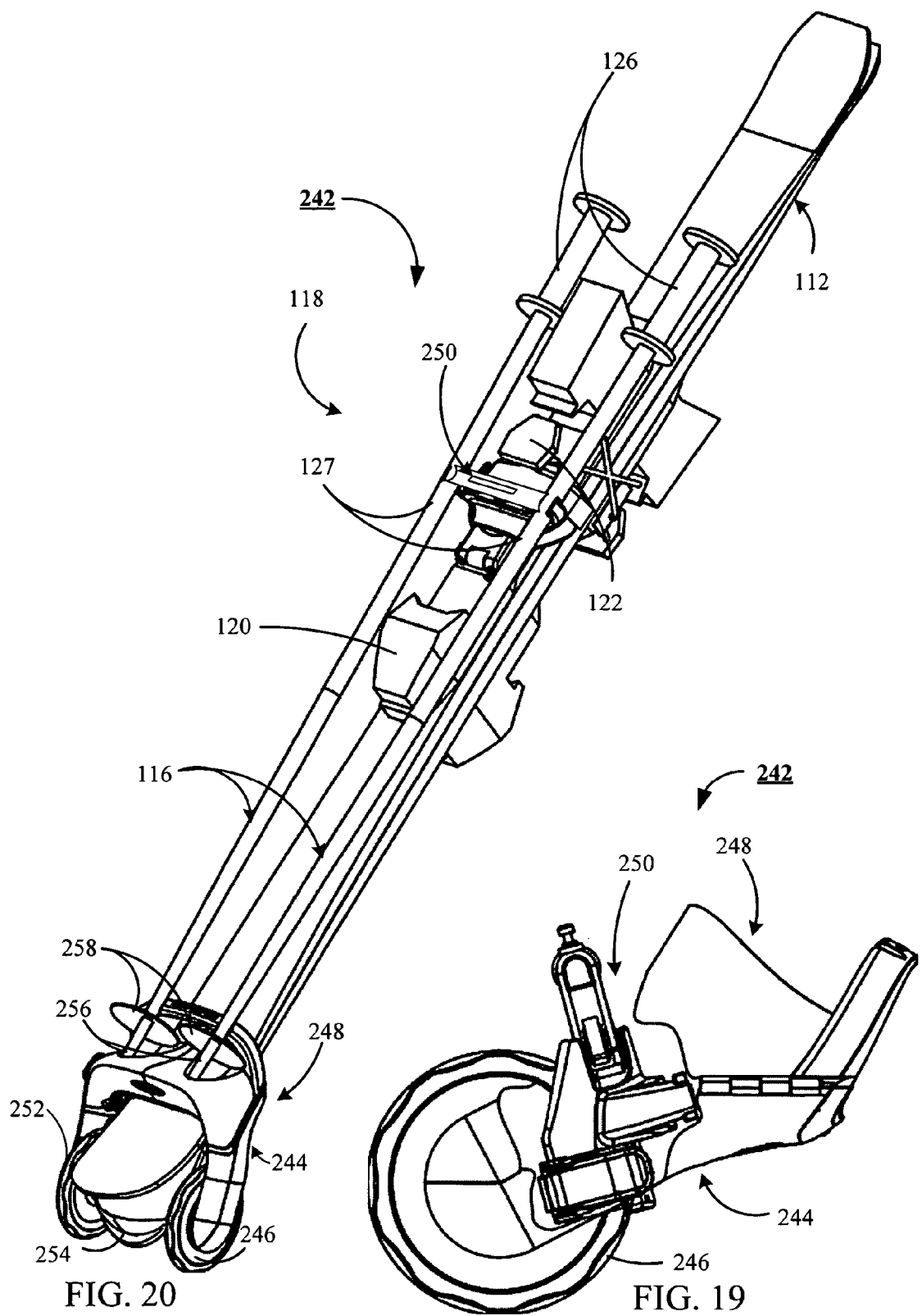
FIG. 19 shows a partial cutaway side elevational view of an alternate preferred embodiment of the novel sports equipment transport apparatus ("transport caddy").
FIG. 20 is a perspective view of the transport caddy of FIG. 19 with snow ski equipment secured thereon.

FIG. 19 shows an alternate preferred embodiment of a novel sports equipment transport apparatus 242 (also referred to herein as "transport caddy 242"). The transport caddy includes at least a base portion 244 supported by a wheel 246, a cover portion 248 hinged to the base portion 244, and an accessories support portion 250 detachably nested within the base portion 244 and secured between the base and cover portions 244, 248, when the cover portion 248 is secured to the base portion 244.

FIG. 20 illustrates the transport caddy 242 has been found useful for manually transporting sports equipment, in particular for use in transporting snow ski equipment. The transport caddy 242 maintains the ski equipment in an organized and transportable configuration, which allows the skier to easily transport the equipment from a car to, for example, a ski lodge, airline terminal, hotel, or home. To facilitate the organization and transport of the ski equipment, the transport caddy 242 preferably provides at least the wheel 246, and more preferably a second wheel 252. The wheels 246 and 252 support the base portion 244, which in turn supports the cover portion 248.

In a preferred embodiment of the transport caddy 242, the base portion 244 provides a rotatable accessories stop 254 configured to accept a tip of one of the pair of alpine snow skis ("skis") 112, and the cover portion 244 is configured to accept pole tips 256 and baskets 258, of the pair of ski poles 116. Each ski of the pair of skis 112 includes the ski boot binding 118 (also referred to herein as binding 118), which includes at least the toe confinement portion 120 and the brake portion 122 (also referred to herein as brake 122). In a preferred embodiment of the transport caddy 242, the tip of one ski of the pair of skis 112 is positioned within the rotatable accessories stop 254 such that the binding 118 of a first ski of the pair of skis 112 faces ground-wardly, while the binding 118 of a second ski of the pair of skis 112 faces sky-wardly.

In the preferred embodiment, the transport caddy 242 further includes the accessories support member 250 supported adjacent the sky-wardly facing binding 118, in particular, the brake 122. Securing the accessories support member 250 adjacent the brake 122 provides a number of advantages to users of the transport caddy 242. Those advantages result from the relationship between a length of the skis 112 and the height of the skier utilizing skis 112 of a particular length. Preferably, as the height of a skier increases, the length of the skis utilized by that skier increases, however the positional relationship of ski boot binding 118, relative to the tip of the ski supporting the ski boot binding 118, remains substantially constant, that is the binding is mounted proportionally the same distance from the tip of the ski for length of ski. In addition to the substantially constant relationship between the positions of the binding relative to the ski tips, the ratio between the overall length of the skis 112 and the overall length of its accompanying pair of ski poles 116 also remains substantially constant.

By selecting the sky-wardly facing binding 118 as the mounting position for the accessories support member 250, and securing the pair of ski poles 116 to the accessories support member 250, the handle portions 126 mounted to a shaft portion 127 of the pair of ski poles 116, are present to the skier at a natural and convenient height for use in towing the skis (provided the skis being towed are sized to the person towing the skis). It is also noted that by presenting both handle portions 126 to the skier at substantially a common height, but offset from one another, the handle portions are positioned for convenient use by the skier using either their right or left hand.

An additional advantage of preferably selecting the sky-wardly facing binding 118 as the mounting position for the accessories support member 250, is that the load of the transport caddy 242, with the skis 112 and the pair of ski poles 116 secured thereto is substantially distributed for enhanced mobility. By preferentially depositing the pair of skis 112 within the rotatable accessories stop 254 such that the bindings 118 and the pair of skis 112 respectfully face ground-wardly and sky-wardly, the amount of flex engineered into each ski of the pair of skis 112 provides a primary spring suspension between the wheels 246 and 252, and the handle portion 126. By mounting the pair of ski poles 116 adjacent the ski boot binding 118, and parallel to the pair of skis 112, a secondary spring suspension is provided between the wheels 102 and 104. The result of the primary and secondary suspensions working in concert mitigates and dampens mechanical shocks encountered by the wheels 246 and 252, traversing uneven and disruptive surfaces.

Figure 21:
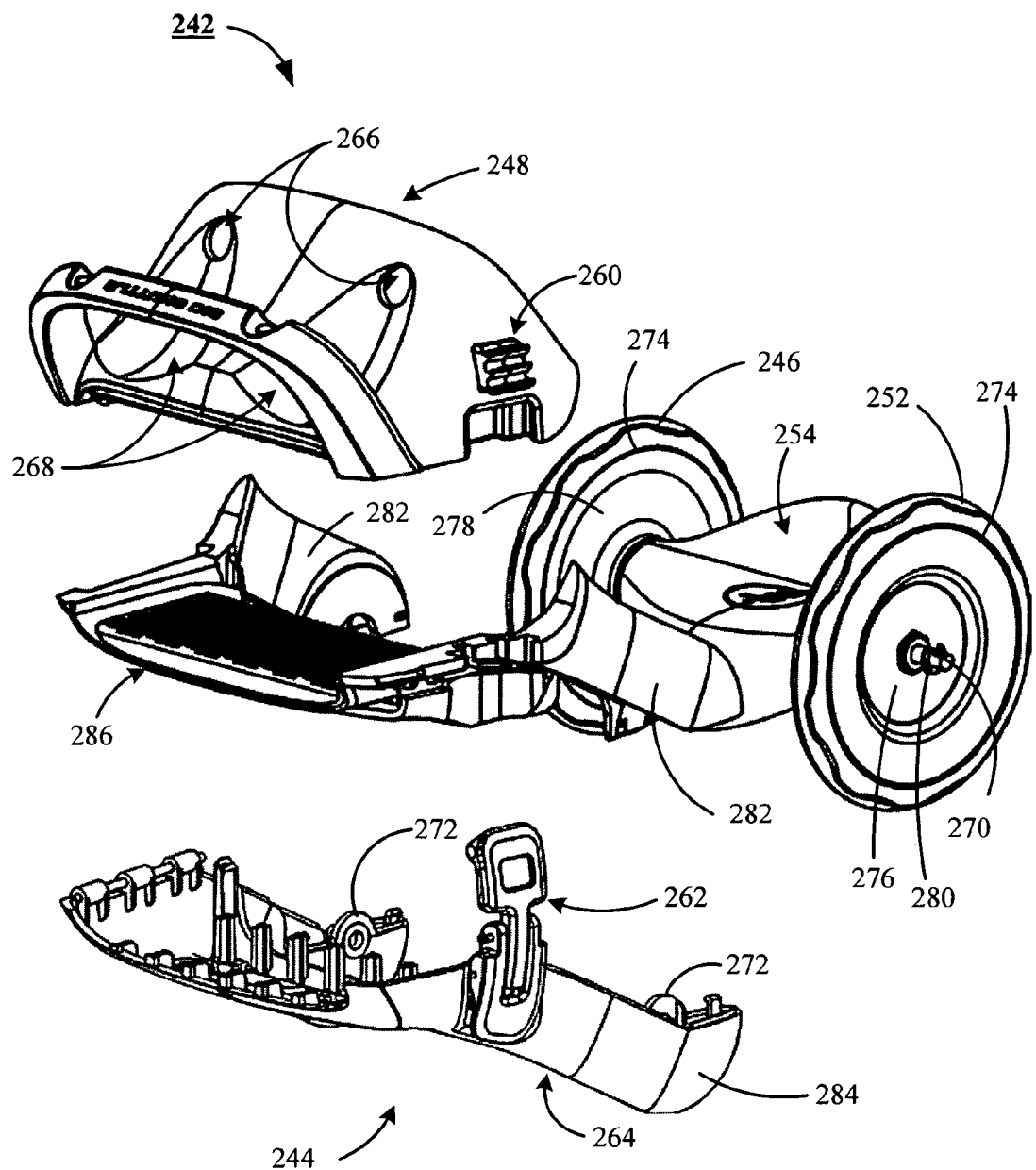
FIG. 21 shows a perspective, exploded view of the transport caddy of FIG. 19.

FIG. 21 shows that the cover portion 248 provides a base restraint 260 which mates to a cover restraint 262 provided by a wheel engagement member 264 of the base portion 244 to constrain the cover portion 248 adjacent the base portion 244, when the cover restraint is activated while fully engaging the base restraint. In a preferred embodiment, the cover restraint is an over-center latch.

FIG. 21 further shows that the cover portion 244 provides a handle 264, found useful in carrying the transport caddy 242 when the transport caddy 242 is not being utilized for transporting the pair of skis 112, and ski poles 116. The cover portion 242 also provides ski pole confinement apertures 266, and recesses 268, which accommodate pole tips 256 and baskets 258 of the ski poles 116 (of FIG. 20) when the transport caddy 242 is being utilized for transporting the pair of skis 112, and ski poles 116.

The rotatable accessories stop 254 provides an axle 270, which after passing through each wheel 146, 152 engages axle supports 272, provided by the wheel engagement member 264. It will be noted that in a preferred embodiment, the wheels 146 and 152 share a common hub 274 and are interchangeable with one another. With the axle 270 passing through a first side 276 of the hub 274, the rotatable accessories stop 254, a second side 278 of the hub 274, each axle support 272, and a fastener 280 is secured to each end of the axle 270, and a wheel engagement member cover 282 is secured to a base shell 284 of the wheel engagement member 264.

When finally assembled, the wheel engagement member 264, the wheel engagement member cover 282, and the rotatable accessories stop 254, limit interference with a rotation of said wheels 246 and 252 caused by debris; and a retention member 286 provided by the wheel engagement cover 282, preferably features a non-slip surface to prevent slippage of an article positioned upon it. In a preferred embodiment the retention member is formed from a polymer such as urethane, or butyl rubber.

Figure 22:
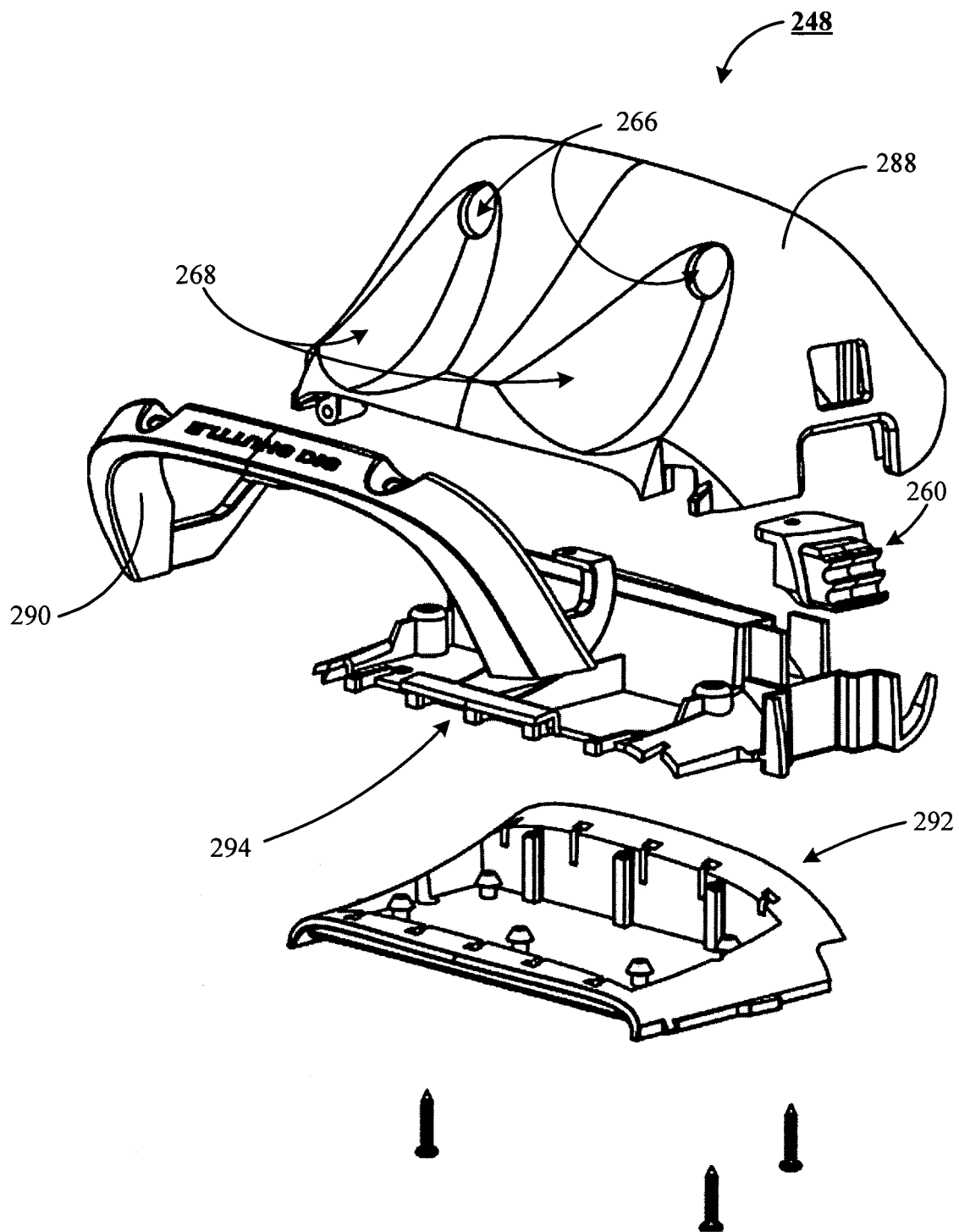
FIG. 22 is a perspective, exploded view of a cover portion of the transport caddy of FIG. 19.

FIG. 22 shows that the base restraint 260, a shell 288, a handle 290, and a second retention member 292, are each secured to an accessories bolster member 294 to form the cover portion 248. When the base restraint 260 fully interacts with the cover restraint 262 (of FIG. 21), the retention member 286 (of FIG. 21) encounters a slight interference with the second retention member 292 to place the base and cover restraints 260, 262 (of FIG. 21) under a tinsel load.

Figure 23:
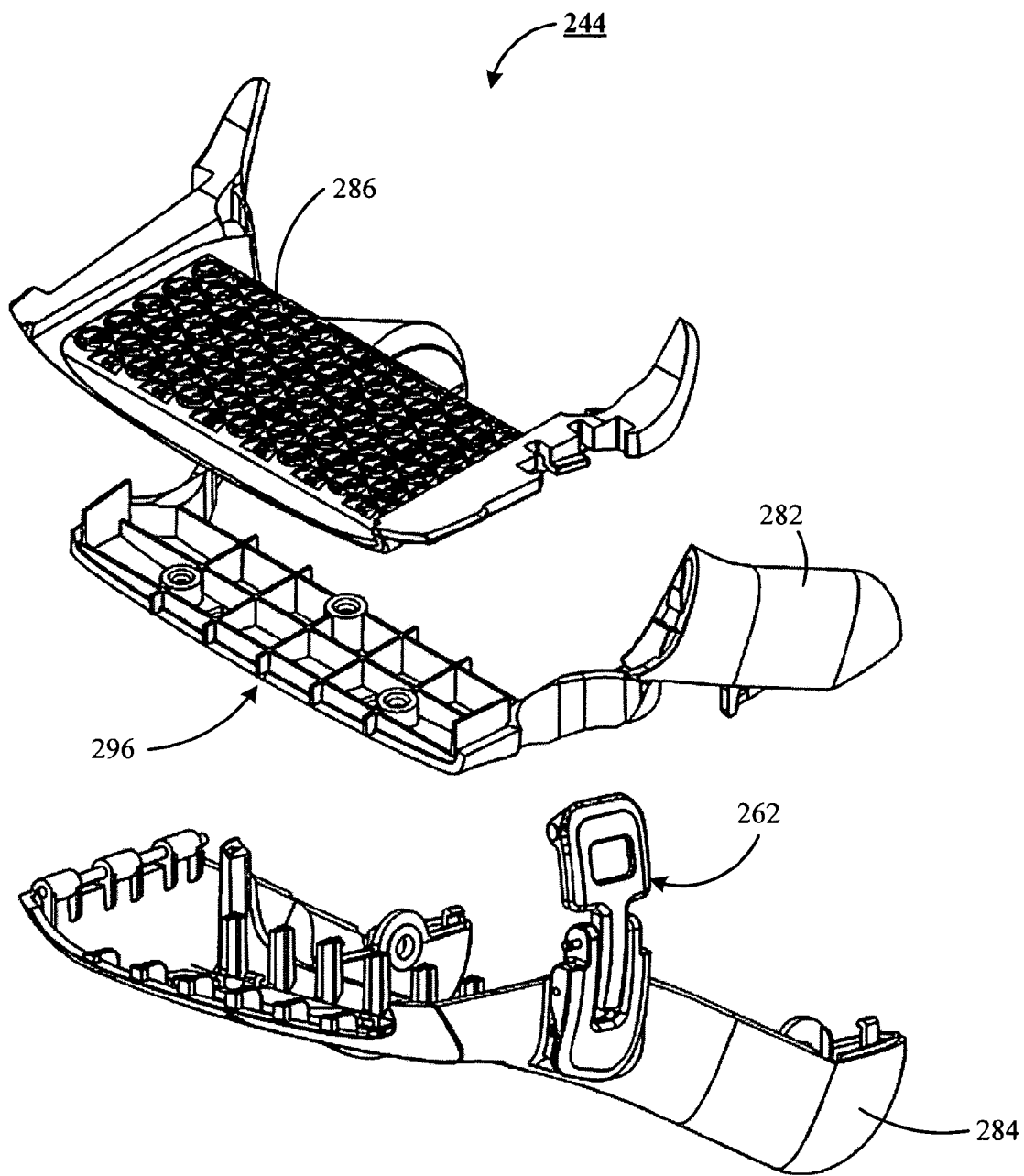
FIG. 23 shows a perspective, exploded view of a base portion of the transport caddy of FIG. 19.

FIG. 23 shows that the cover restraint 262, the base shell 284, the wheel engagement member cover 282, and the retention member 286, are each secured to an accessories buttress member 296 to form the base portion 244. When the cover restraint 262 fully interacts with the base restraint 260 (of FIG. 22), the second retention member 292 (of FIG. 22) encounters a slight interference with the retention member 286 to place the base and cover restraints 260, 262 (of FIG. 21) under a tinsel load.

Figure 24:
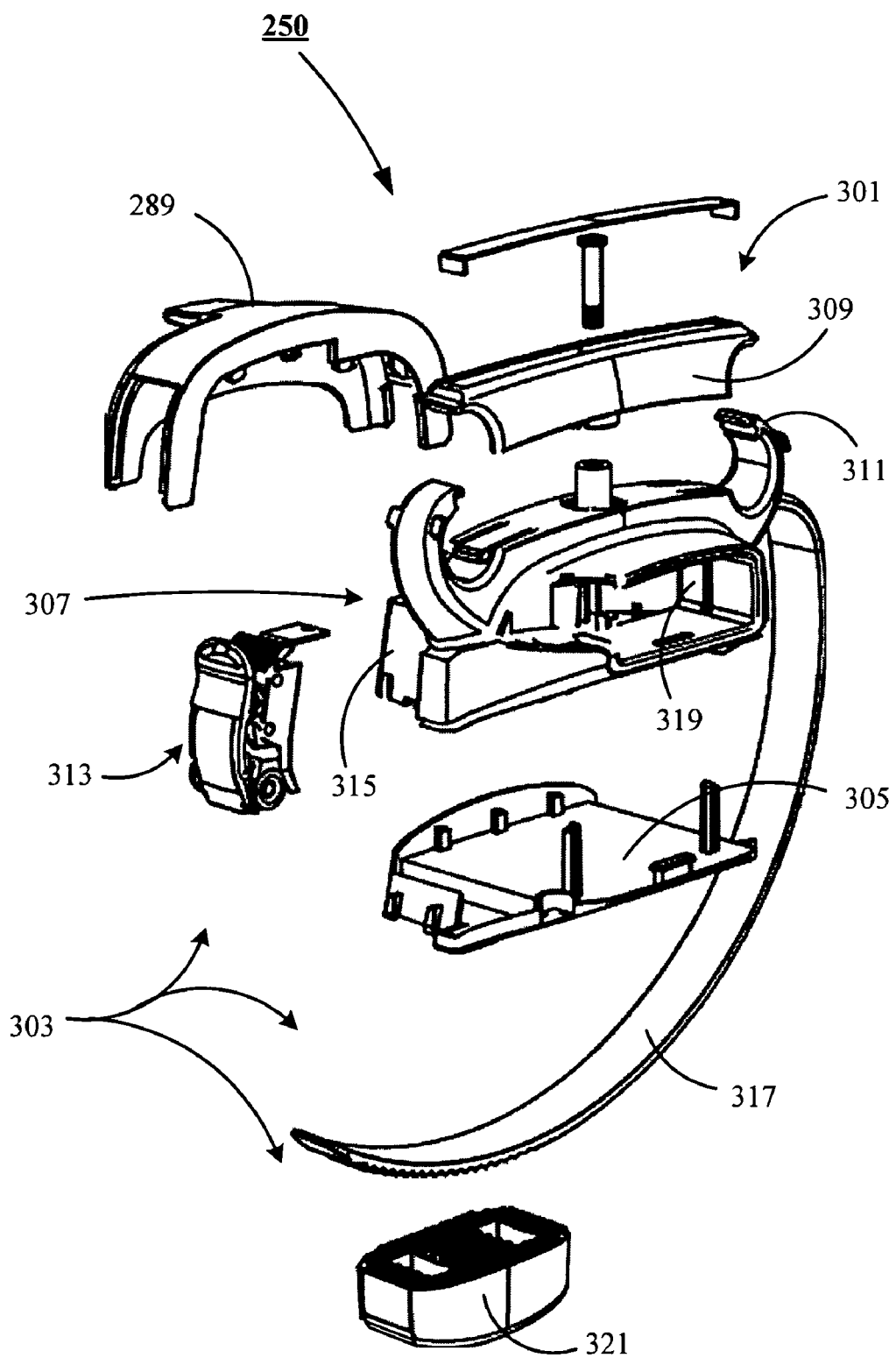
FIG. 24 is a perspective, exploded view of an accessories support portion of the transport caddy of FIG. 19.

FIG. 24 shows that an accessories support alignment member 298, an accessories lockdown assembly 301, a latch assembly 303, and a first retention pad 305 are each secured to a chassis 307. The lockdown assembly 301 preferably includes at least a ski pole confinement member 309 rotatably secured to the chassis 307, and a ski pole retention portion 311 provided by the chassis 307. Preferably, when an accessory, such as a ski pole 116 (of FIG. 20), is disposed within the ski pole retention portion 311, and said ski pole confinement member 308 is rotated into adjacency with the ski pole retention portion 311, said accessory is secured between said ski pole retention portion 311 and said ski pole confinement member 309.

The latch assembly 307 preferably includes at least a restraint take-up mechanism 313 secured to a first side 315 of the chassis 307, a flexible restraint 317 secured to a second side 319 of the chassis 307, and a second retention pad 321 movably affixed to the flexible restraint 317. Preferably, when the flexible restraint 317 encloses an accessory, such as a pair of alpine snow skis 112 (of FIG. 20), and is in gripping communication with the restraint take-up mechanism 313, the restraint take-up mechanism 313 is manipulated to draw said flexible restraint 316, via the second retention pad 321, into pressing engagement with the pair of alpine snow skis 112.

Figure 25:
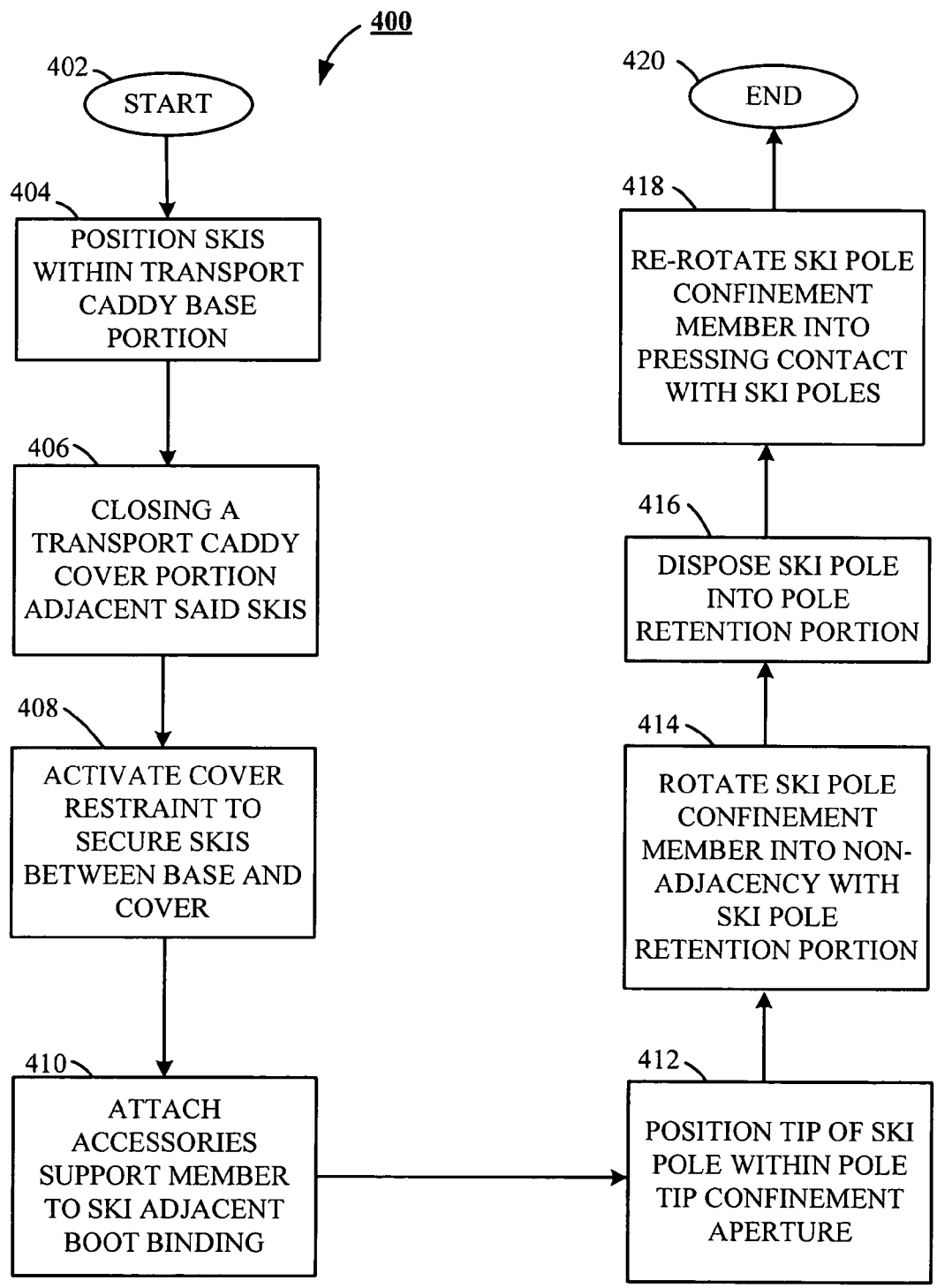
FIG. 25 shows a flow chart of a method of using the transport caddy of FIG. 19.

FIG. 25 shows a method 400 of using an inventive transport caddy (such as 242) commencing at start step 402 and continuing at process step 404. At process step 404, a pair of skis (such as 112) are positioned within a base portion (such as 244), and at process step 406, a cover portion (such as 248) is closed adjacent the pair of skis to secure the skis within the confinement compartment.

At process step 408, a cover restraint (such as 262) is linked to a base restraint (such as 260) and activated to secure the skis between the base and cover portions. At process step 410, an accessories support portion (such as 250) is attached adjacent a brake (such as 122) of a boot binding (such as 118). At process step 412, each tip (such as 256) of a pair of ski poles (such as 116) are advanced through corresponding ski pole tip apertures (such as 266) to position each basket (such as 258) of each ski pole within a recess (such as 268) provided by a shell (such as 288).

With the tips of the ski poles positioned within their corresponding pole tip apertures, a ski pole confinement member (such as 309) is rotated into non-adjacency with a ski pole retention portion (such as 311) at process step 414. At process step 416, each shaft (such as 127) of each ski pole is slid into their respective positions within the ski pole retention portion. At process step 418, the ski pole confinement member is re-rotated into pressing contact with the respective shaft portions of each ski pole, and the process concludes at end process step 420.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claims.

What is claimed is:

1. A transport caddy comprising:
   a base portion supported by a wheel and providing a cover restraint;
   a wheel engagement member attached to a first side of a hub of said wheel;
   a wheel engagement member cover attached to said wheel engagement member and adjacent to said first side of said hub of said wheel; and
   a rotatable accessories stop attached to a second side of said hub of said wheel, and providing an axle for said wheel, wherein said wheel engagement member, said wheel engagement member cover, and said rotatable accessories stop constrain debris from interfering with a rotation of said wheel, in which said base portion includes at least, a cover portion selectively constrained adjacent said base portion by said cover restraint, an accessories support portion detachably nested within said base portion and secured between said base and cover portions when said cover restraint constrains said cover portion adjacent said base portion, an accessories buttress member secured to said wheel engagement member, and a retention member supported by said accessories buttress member, wherein said retention member pressingly engages said accessories support portion when said cover restraint constrains said cover portion adjacent said base portion.

2. The transport caddy as claimed in claim 1, in which said wheel is a first wheel and further comprising:
   a second wheel supporting said base portion;
   a first axle support of the wheel engagement member supporting said first wheel; and
   a second axle support of the wheel engagement member supporting said second wheel.

3. The transport caddy as claimed in claim 1, in which said base portion further comprising:
   the wheel engagement member cover communicating with said accessories buttress member, attached to said wheel engagement member, and adjacent said first side of said hub of said wheel.

4. The transport caddy as claimed in claim 1, in which said retention member is a first retention member, an wherein said cover portion comprising:
   a base restraint configured for interaction with said cover restraint;
   an accessories bolster member configured for alignment with said accessories buttress member; and
   a second retention member supported by said accessories bolster member, wherein said second retention member pressingly engages said accessories support portion when said cover restraint communicating with said base restraint constrains said cover portion adjacent said base portion.

5. The transport caddy as claimed in claim 4, in which said cover portion further comprising:
   a handle secured to said accessories bolster member for carrying said base and cover portions when constrained adjacent one another; and
   a shell attached to said accessories bolster member and providing a pole tip confinement aperture for receipt of an accessory.

6. The transport caddy as claimed in claim 1, in which said accessories support portion comprising:
   a chassis;
   an accessories lockdown assembly secured to said chassis, and configured for securement of an accessory; and
   a latch assembly communicating with said chassis, and configured for securement of an article adjacent said chassis.

7. The transport caddy as claimed in claim 6, in which said lockdown assembly comprising:
   a ski pole confinement member rotatably secured to said chassis; and
   a ski pole retention portion provided by said chassis, wherein when said accessory is disposed within said ski pole retention portion, and said ski pole confinement member is rotated into adjacency with said ski pole retention portion, said accessory is secured between said ski pole retention portion and said ski pole confinement member.

8. The transport caddy as claimed in claim 6, in which said latch assembly comprising:
   a restraint take-up mechanism secured to a first side of said chassis; and
   a flexible restraint secured to a second side of said chassis, wherein when said flexible restraint encloses said accessory and is in gripping communication with said restraint take-up mechanism, said restraint take-up mechanism is manipulated to draw said flexible restraint into pressing engagement with said accessory.

9. A transport caddy comprising:
   a base portion supported by a wheel and providing a cover restraint;
   a cover portion selectively constrained adjacent said base portion by said cover restraint, wherein said cover portion comprises:
      an accessories bolster member configured for alignment with an alpine snow ski; and
      a shell attached to said accessories bolster member and providing a pole tip confinement aperture for receipt of an alpine ski pole;
   a spring suspension removably disposed within said base portion and detachably secured within said base portion by said cover portion;
   an accessories support portion detachably attached to said spring suspension;
   a tow handle removably disposed within said accessories support portion and detachably secured adjacent said spring suspension by said accessories support member;
   a wheel engagement member attached to said wheel;
   an accessories buttress member attached directly to said wheel engagement member; and
   a suspension retention member supported by said accessories buttress member, wherein said suspension retention member pressingly engages said alpine snow ski when said cover restraint constrains said cover portion adjacent said base portion.

10. The transport caddy as claimed in claim 9, in which said spring suspension is said alpine snow ski, said tow handle is said alpine ski pole, and said cover portion comprising:
   a base restraint configured for interaction with said cover restraint;
   a suspension retention member supported by said accessories bolster member, wherein said suspension retention member pressingly engages said alpine snow ski when said cover restraint constrains said cover portion adjacent said base portion; and
   a handle secured to said accessories bolster member for carrying said base and cover portions when constrained adjacent one another.

11. The transport caddy as claimed in claim 9, in which said spring suspension is said alpine snow ski, said tow handle is an alpine ski pole, and said accessories support portion comprising:
- a chassis;
- an alpine ski pole lockdown assembly secured to said chassis, and configured for securement of said alpine ski pole; and
- a latch assembly communicating with said chassis, and configured for securement of said alpine ski adjacent said chassis.

12. The transport caddy as claimed in claim 11, in which said latch assembly comprising a restraint take-up mechanism and a flexible restraint configured for interaction with said restraint take-up mechanism, and wherein said lockdown assembly comprising:
- a ski pole retention portion confining said ski pole; and
- a ski pole confinement member secured to said chassis, wherein when said ski pole confinement is positioned adjacent said alpine ski pole and aligned with said ski pole retention portion, said alpine ski pole is constrained between said ski pole retention portion and said ski pole confinement member.

* * * * *